United States Patent
Sakuma et al.

(10) Patent No.: US 9,825,338 B2
(45) Date of Patent: Nov. 21, 2017

(54) ELECTROLYTIC SOLUTION, NON-AQUEOUS SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: Sony Corporation, Tokyo (JP)

(72) Inventors: Tomomi Sakuma, Fukushima (JP); Midori Sugawara, Fukushima (JP); Toru Odani, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/369,248

(22) Filed: Dec. 5, 2016

(65) Prior Publication Data

US 2017/0149098 A1   May 25, 2017

Related U.S. Application Data

(63) Continuation of application No. 14/175,848, filed on Feb. 7, 2014, now Pat. No. 9,515,350.

(30) Foreign Application Priority Data

Feb. 15, 2013 (JP) ................... 2013-028185

(51) Int. Cl.
  *H01M 6/16* (2006.01)
  *H01M 10/42* (2006.01)
  *H01M 10/0525* (2010.01)
  *H01M 10/0568* (2010.01)
  *H01M 10/0567* (2010.01)

(52) U.S. Cl.
  CPC ... *H01M 10/4235* (2013.01); *H01M 10/0525* (2013.01); *H01M 10/0567* (2013.01); *H01M 10/0568* (2013.01)

(58) Field of Classification Search
  CPC ......... H01M 10/0566; H01M 10/0567; H01M 10/0568; H01M 10/0569
  See application file for complete search history.

(56) References Cited

U.S. PATENT DOCUMENTS

| 2011/0159370 A1* | 6/2011 | Inaba | H01M 4/131 429/231.1 |
| 2013/0029255 A1* | 1/2013 | Inasaki | G03F 7/0045 430/5 |

FOREIGN PATENT DOCUMENTS

JP  2010-159242  * 7/2010 ........... C07C 311/48

* cited by examiner

Primary Examiner — Patrick Ryan
Assistant Examiner — Ben Lewis
(74) Attorney, Agent, or Firm — Sheridan Ross P.C.

(57) ABSTRACT

A non-aqueous secondary battery includes a cathode, an anode, and an electrolytic solution. The electrolytic solution includes a non-aqueous solvent, an electrolyte salt, and one or both of a disulfonyl compound represented by a following Formula (1) and a disulfinyl compound represented by a following Formula (2),

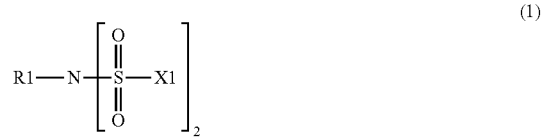

where R1 is one of a hydrocarbon group, a halogenated hydrocarbon group, an oxygen-containing hydrocarbon group, a halogenated oxygen-containing hydrocarbon group, and a group obtained by bonding two or more thereof to one another; and X1 is a halogen group,

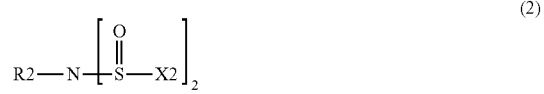

where R2 is one of a hydrocarbon group, a halogenated hydrocarbon group, an oxygen-containing hydrocarbon group, a halogenated oxygen-containing hydrocarbon group, and a group obtained by bonding two or more thereof to one another; and X2 is a halogen group.

11 Claims, 7 Drawing Sheets

ELECTROLYTIC SOLUTION, NON-AQUEOUS SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCE TO RELATED APPLICATIONS

This application is a continuation of U.S. patent application Ser. No. 14/175,848, filed Feb. 7, 2014, which claims the benefit of Japanese Priority Patent Application JP 2013-28185, filed on Feb. 15, 2013, the entire disclosures of which are hereby incorporated herein by reference.

BACKGROUND

The present technology relates to an electrolytic solution including a non-aqueous solvent and an electrolyte salt, to a non-aqueous secondary battery using the electrolytic solution, and to a battery pack, an electric vehicle, an electric power storage system, an electric power tool, and an electronic apparatus that use the non-aqueous secondary battery.

In recent years, various electronic apparatuses such as a mobile phone and a personal digital assistant (PDA) have been widely used, and it has been demanded to further reduce the size and the weight of the electronic apparatuses and to achieve their long life. Accordingly, as an electric power source for the electronic apparatuses, a battery, in particular, a small and light-weight secondary battery capable of providing high energy density has been developed.

In these days, it has been considered to apply such a secondary battery to various other applications in addition to the foregoing electronic apparatuses. Examples of such other applications may include a battery pack attachably and detachably mounted on the electronic apparatuses or the like, an electric vehicle such as an electric automobile, an electric power storage system such as a home electric power server, and an electric power tool such as an electric drill. Further, applications other than the foregoing examples may be adopted.

Secondary batteries utilizing various charge and discharge principles to obtain a battery capacity have been proposed. In particular, a secondary battery utilizing insertion and extraction of an electrode reactant, a secondary battery utilizing precipitation and dissolution of an electrode reactant, and the like have attracted attention, since these secondary batteries provide higher energy density.

The secondary battery includes a cathode, an anode, and an electrolytic solution. The cathode includes a cathode active material layer containing a cathode active material, and the anode includes an anode active material layer containing an anode active material. The electrolytic solution contains a non-aqueous solvent and an electrolyte salt Since configurations of secondary batteries largely affect battery performance, various studies have been made on the configurations of the secondary batteries for various purposes.

Specifically, in order to improve charge and discharge cycle characteristics and high-temperature conservation characteristics, an alkane amine derivative is added to an electrolytic solution (for example, see Japanese Unexamined Patent Application Publication No. 2011-044352). Examples of the alkane amine derivative may include a compound represented by R4-N—[S(=O)$_2$—R5]$_2$ (where R4 is one of an alkyl group and the like, and R5 is a perfluoroalkyl group). Other examples of the alkane amine derivative may include R6-N—[S(=O)—R7)$_2$] (where R6 is one of an alkyl group and the like, and R7 is a perfluoroalkyl group).

Further, in order to suppress swollenness at the time of conservation at high temperature, a salt is provided on the surface of a cathode active material or the surface of a cathode active material layer (for example, see Japanese Unexamined Patent Application Publication No. 2010-080229). Examples of the salt may include a compound represented by (NR1R2R)(A$^-$)(M$^+$) (where R is one of a hydrogen group, a hydrocarbon group, and the like, R1 and R2 each are one of a hydrocarbon group and the like, A is an acid anion, and M is a metal ion).

In addition thereto, as a related technology, in order to improve voltage resistance and long-time reliability of an electrochemical capacitor, in an electrolytic solution containing an electrolyte salt having quaternary ammonium salt as a main component, the total content of tertiary amine and/or the like is kept to a value equal to or less than a predetermined amount (for example, see Japanese Unexamined Patent Application Publication No. 2000-311839).

Further, in order to obtain an electrolyte salt useful for an electrolytic solution, a method of manufacturing quaternary alkyl ammonium tetrafluoroborate salt has been proposed (for example, see Japanese Unexamined Patent Application Publication No. 2000-226360). In such a manufacturing method, halogenated alkyl is reacted with secondary amine, and thereafter, fluoroboric acid is reacted therewith.

SUMMARY

In recent years, high performance and multi-functions of the electronic apparatuses and the like to which the secondary battery is applied are increasingly developed. Frequency in use of the electronic apparatuses and the like is increased as well. Therefore, further improvement of the battery characteristics of the secondary battery has been desired.

It is desirable to provide an electrolytic solution, a non-aqueous secondary battery, a battery pack, an electric vehicle, an electric power storage system, an electric power tool, and an electronic apparatus that are capable of obtaining superior battery characteristics.

According to an embodiment of the present technology, there is provided an electrolytic solution including a non-aqueous solvent, an electrolyte salt, and one or both of a disulfonyl compound represented by the following Formula (1) and a disulfinyl compound represented by the following Formula (2),

where R1 is one of a hydrocarbon group, a halogenated hydrocarbon group, an oxygen-containing hydrocarbon group, a halogenated oxygen-containing hydrocarbon group, and a group obtained by bonding two or more thereof to one another; and X1 is a halogen group,

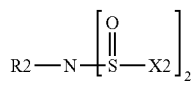

(2)

where R2 is one of a hydrocarbon group, a halogenated hydrocarbon group, an oxygen-containing hydrocarbon group, a halogenated oxygen-containing hydrocarbon group, and a group obtained by bonding two or more thereof to one another; and X2 is a halogen group.

According to an embodiment of the present technology, there is provided a non-aqueous secondary battery including: a cathode; an anode; and an electrolytic solution. The electrolytic solution includes a non-aqueous solvent, an electrolyte salt, and one or both of a disulfonyl compound represented by a following Formula (1) and a disulfinyl compound represented by a following Formula (2),

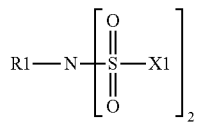

(1)

where R1 is one of a hydrocarbon group, a halogenated hydrocarbon group, an oxygen-containing hydrocarbon group, a halogenated oxygen-containing hydrocarbon group, and a group obtained by bonding two or more thereof to one another; and X1 is a halogen group,

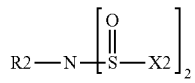

(2)

where R2 is one of a hydrocarbon group, a halogenated hydrocarbon group, an oxygen-containing hydrocarbon group, a halogenated oxygen-containing hydrocarbon group, and a group obtained by bonding two or more thereof to one another; and X2 is a halogen group.

According to an embodiment of the present technology, there is provided a battery pack including: a non-aqueous secondary battery; a control section configured to control operation of the non-aqueous secondary battery; and a switch section configured to switch the operation of the non-aqueous secondary battery according to an instruction of the control section. The non-aqueous secondary battery includes a cathode, an anode, and an electrolytic solution, and the electrolytic solution includes a non-aqueous solvent, an electrolyte salt, and one or both of a disulfonyl compound represented by a following Formula (1) and a disulfinyl compound represented by a following Formula (2),

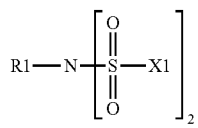

(1)

where R1 is one of a hydrocarbon group, a halogenated hydrocarbon group, an oxygen-containing hydrocarbon group, a halogenated oxygen-containing hydrocarbon group, and a group obtained by bonding two or more thereof to one another; and X1 is a halogen group,

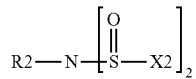

(2)

where R2 is one of a hydrocarbon group, a halogenated hydrocarbon group, an oxygen-containing hydrocarbon group, a halogenated oxygen-containing hydrocarbon group, and a group obtained by bonding two or more thereof to one another; and X2 is a halogen group.

According to an embodiment of the present technology, there is provided an electric vehicle including: a non-aqueous secondary battery; a conversion section configured to convert electric power supplied from the non-aqueous secondary battery into drive power; a drive section configured to operate according to the drive power; and a control section configured to control operation of the non-aqueous secondary battery. The non-aqueous secondary battery includes a cathode, an anode, and an electrolytic solution, and the electrolytic solution includes a non-aqueous solvent, an electrolyte salt, and one or both of a disulfonyl compound represented by a following Formula (1) and a disulfinyl compound represented by a following Formula (2),

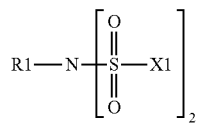

(1)

where R1 is one of a hydrocarbon group, a halogenated hydrocarbon group, an oxygen-containing hydrocarbon group, a halogenated oxygen-containing hydrocarbon group, and a group obtained by bonding two or more thereof to one another; and X1 is a halogen group,

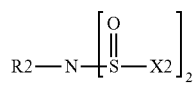

(2)

where R2 is one of a hydrocarbon group, a halogenated hydrocarbon group, an oxygen-containing hydrocarbon group, a halogenated oxygen-containing hydrocarbon group, and a group obtained by bonding two or more thereof to one another; and X2 is a halogen group.

According to an embodiment of the present technology, there is provided an electric power storage system including: a non-aqueous secondary battery; one or more electric devices configured to be supplied with electric power from the non-aqueous secondary battery; and a control section configured to control the supplying of the electric power from the non-aqueous secondary battery to the one or more electric devices. The non-aqueous secondary battery includes a cathode, an anode, and an electrolytic solution, and the electrolytic solution includes a non-aqueous solvent, an electrolyte salt, and one or both of a disulfonyl compound represented by a following Formula (1) and a disulfinyl compound represented by a following Formula (2),

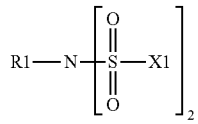
(1)

where R1 is one of a hydrocarbon group, a halogenated hydrocarbon group, an oxygen-containing hydrocarbon group, a halogenated oxygen-containing hydrocarbon group, and a group obtained by bonding two or more thereof to one another; and X1 is a halogen group,

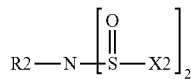
(2)

where R2 is one of a hydrocarbon group, a halogenated hydrocarbon group, an oxygen-containing hydrocarbon group, a halogenated oxygen-containing hydrocarbon group, and a group obtained by bonding two or more thereof to one another; and X2 is a halogen group.

According to an embodiment of the present technology, there is provided an electric power tool including: a non-aqueous secondary battery; and a movable section configured to be supplied with electric power from the non-aqueous secondary battery. The non-aqueous secondary battery includes a cathode, an anode, and an electrolytic solution, and the electrolytic solution includes a non-aqueous solvent, an electrolyte salt, and one or both of a disulfonyl compound represented by a following Formula (1) and a disulfinyl compound represented by a following Formula (2),

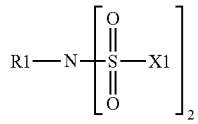
(1)

where R1 is one of a hydrocarbon group, a halogenated hydrocarbon group, an oxygen-containing hydrocarbon group, a halogenated oxygen-containing hydrocarbon group, and a group obtained by bonding two or more thereof to one another; and X1 is a halogen group,

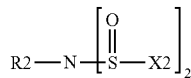
(2)

where R2 is one of a hydrocarbon group, a halogenated hydrocarbon group, an oxygen-containing hydrocarbon group, a halogenated oxygen-containing hydrocarbon group, and a group obtained by bonding two or more thereof to one another; and X2 is a halogen group.

According to an embodiment of the present technology, there is provided an electronic apparatus including a non-aqueous secondary battery as an electric power supply source. The non-aqueous secondary battery includes a cathode, an anode, and an electrolytic solution, and the electrolytic solution includes a non-aqueous solvent, an electrolyte salt, and one or both of a disulfonyl compound represented by a following Formula (1) and a disulfinyl compound represented by a following Formula (2),

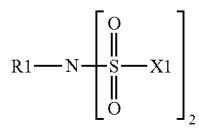
(1)

where R1 is one of a hydrocarbon group, a halogenated hydrocarbon group, an oxygen-containing hydrocarbon group, a halogenated oxygen-containing hydrocarbon group, and a group obtained by bonding two or more thereof to one another; and X1 is a halogen group,

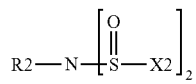
(2)

where R2 is one of a hydrocarbon group, a halogenated hydrocarbon group, an oxygen-containing hydrocarbon group, a halogenated oxygen-containing hydrocarbon group, and a group obtained by bonding two or more thereof to one another; and X2 is a halogen group.

The term "hydrocarbon group" is a generic term used to refer to monovalent groups configured of carbon (C) and hydrogen (H). The term "halogenated hydrocarbon group" refers to a group obtained by substituting part or all of hydrogen out of the hydrocarbon group by a halogen. The term "oxygen-containing hydrocarbon group" is a generic term used to refer to monovalent groups configured of oxygen (O) together with carbon and hydrogen. The term "halogenated oxygen-containing hydrocarbon group" refers to a group obtained by substituting part or all of hydrogen out of an oxygen-containing hydrocarbon group by a halogen. The term "group obtained by bonding two or more thereof to one another" refers to a group obtained by bonding any two or more of the hydrocarbon group, the halogenated hydrocarbon group, the oxygen-containing hydrocarbon group, and the halogenated oxygen-containing hydrocarbon group to one another so that the valency becomes monovalent as a whole.

According to the electrolytic solution and the non-aqueous secondary battery according to the embodiments of the present technology, the electrolytic solution contains one or both of the foregoing disulfonyl compound and the foregoing disulfinyl compound. Therefore, superior battery characteristics are obtainable. Further, according to the battery pack, the electric vehicle, the electric power storage system, the electric power tool, and the electronic apparatus according to the embodiments of the present technology, similar effects are obtainable.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

An embodiment of the present technology will be described below in detail with reference to the drawings. The description will be given in the following order.

1. Electrolytic Solution and Non-Aqueous Secondary Battery
   1-1. Lithium Ion Secondary Battery (Cylindrical Type)
   1-2. Lithium Ion Secondary Battery (Laminated Film Type)
   1-3. Lithium Metal Secondary Battery (Cylindrical Type and Laminated Film Type)
2. Applications of Non-Aqueous Secondary Battery
   2-1. Battery Pack
   2-2. Electric Vehicle
   2-3. Electric Power Storage System
   2-4. Electric Power Tool

[1. Electrolytic Solution and Non-Aqueous Secondary Battery]

[1-1. Lithium Ion Secondary Battery (Cylindrical Type)]

Figure 1:
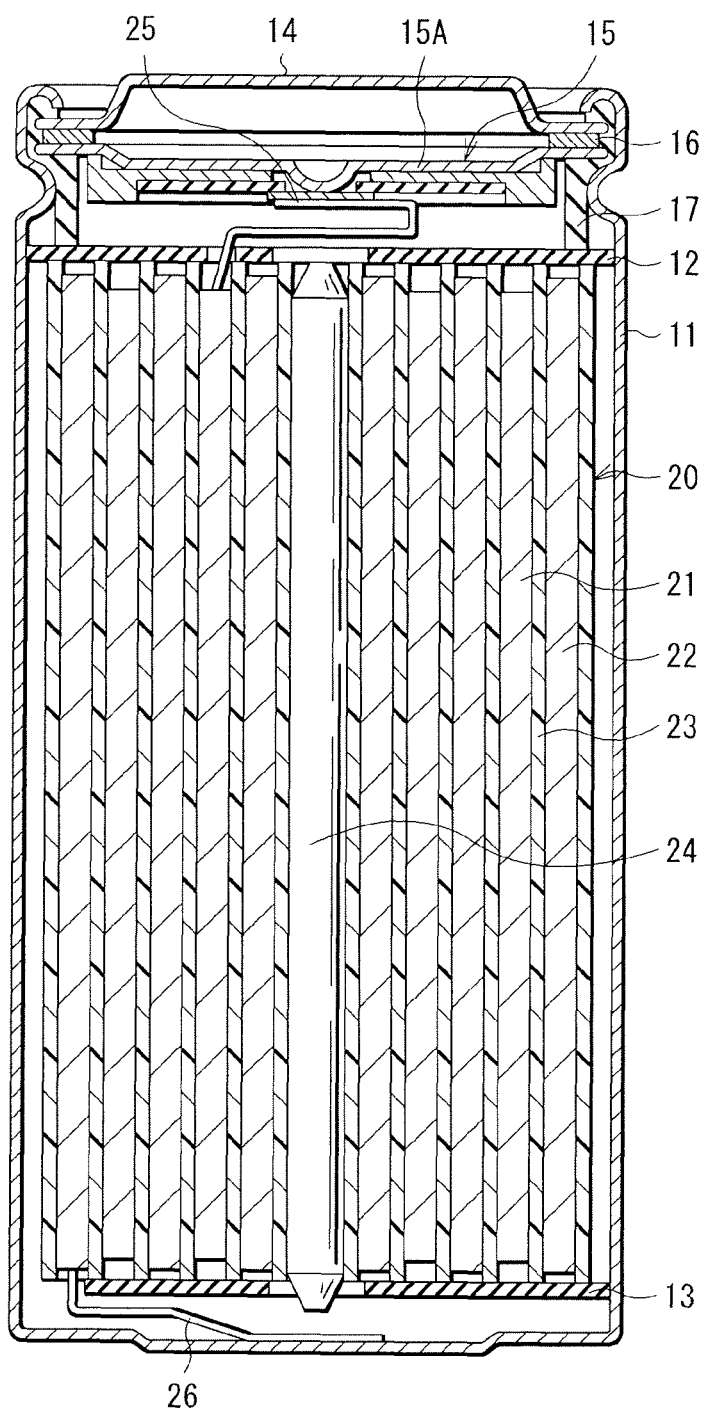
FIG. 1 is a cross-sectional view illustrating a configuration of a non-aqueous secondary battery (cylindrical type) including an electrolytic solution according to an embodiment of the present technology.
Figure 2:
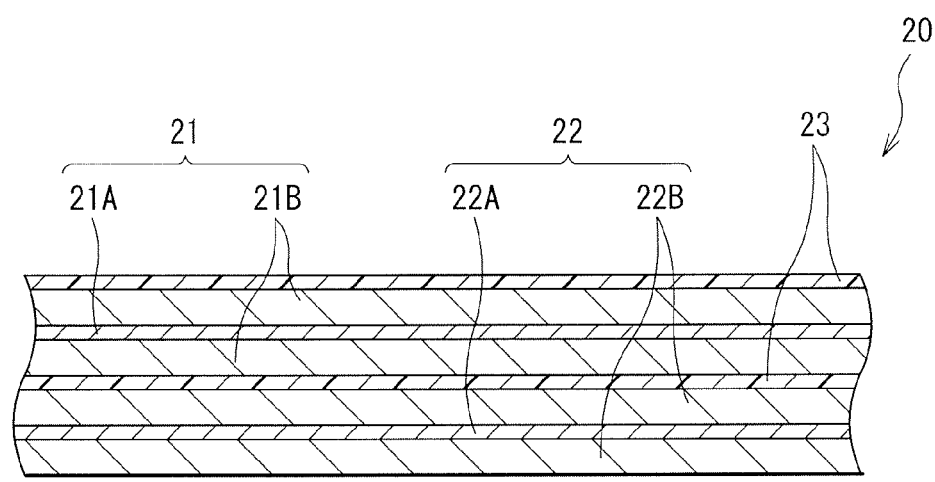
FIG. 2 is a cross-sectional view illustrating an enlarged part of a spirally wound electrode body illustrated in FIG. 1.

FIG. 1 and FIG. 2 illustrate cross-sectional configurations of a non-aqueous secondary battery (simply referred to as "secondary battery" below) using an electrolytic solution according to an embodiment of the present technology. FIG. 2 illustrates enlarged part of a spirally wound electrode body 20 illustrated in FIG. 1.

[Whole Configuration of Secondary Battery]

The secondary battery described here is a lithium secondary battery (lithium ion secondary battery) in which the capacity of an anode 22 is obtained by insertion and extraction of lithium (lithium ion) as an electrode reactant, and has a so-called cylindrical-type battery structure.

The secondary battery may contain, for example, a pair of insulating plates 12 and 13 and the spirally wound electrode body 20 inside a battery can 11 in the shape of a hollow cylinder. The spirally wound electrode body 20 may be formed by, for example, laminating a cathode 21 and the anode 22 with a separator 23 in between, and subsequently spirally winding the resultant laminated body.

The battery can 11 may have, for example, a hollow structure in which one end of the battery can 11 is closed and the other end of the battery can 11 is opened. The battery can 11 may be made, for example, of iron (Fe), aluminum (Al), an alloy thereof, or the like. The surface of the battery can 11 may be plated with nickel (Ni) or the like. The pair of insulating plates 12 and 13 is arranged to sandwich the spirally wound electrode body 20 in between, and to extend perpendicularly to the spirally wound periphery surface of the spirally wound electrode body 20.

At the open end of the battery can 11, a battery cover 14, a safety valve mechanism 15, and a positive temperature coefficient device (PTC device) 16 are attached by being swaged with a gasket 17. Thereby, the battery can 11 is hermetically sealed. The battery cover 14 may be made of, for example, a material similar to that of the battery can 11. The safety valve mechanism 15 and the PTC device 16 are provided inside the battery cover 14. The safety valve mechanism 15 is electrically connected to the battery cover 14 through the PTC device 16. In the safety valve mechanism 15, in the case where the internal pressure becomes a certain level or more by internal short circuit, external heating, or the like, a disk plate 15A inverts to cut electric connection between the battery cover 14 and the spirally wound electrode body 20. The PTC device 16 prevents abnormal heat generation resulting from a large current. As temperature rises, resistance of the PTC device 16 is increased accordingly. The gasket 17 may be made of, for example, an insulating material. The surface of the gasket 17 may be coated with asphalt.

In the space of the center of the spirally wound electrode body 20, for example, a center pin 24 may be inserted. However, the center pin 24 is not necessarily included therein. For example, a cathode lead 25 made of an electrically-conductive material such as aluminum may be connected to the cathode 21. For example, an anode lead 26 made of an electrically-conductive material such as nickel may be connected to the anode 22. For example, the cathode lead 25 may be welded to the safety valve mechanism 15, and may be electrically connected to the battery cover 14. For example, the anode lead 26 may be welded to the battery can 11, and may be electrically connected to the battery can 11.

[Cathode]

The cathode 21 has a cathode active material layer 21B on a single surface or both surfaces of a cathode current collector 21A. The cathode current collector 21A may be made of, for example, an electrically-conductive material such as aluminum, nickel, and stainless steel.

The cathode active material layer 21B contains, as cathode active materials, one or more of cathode materials capable of inserting and extracting lithium ions. The cathode active material layer 21B may further contain one or more of other materials such as a cathode binder and a cathode electric conductor.

The cathode material may be preferably a lithium-containing compound, since high energy density is thereby obtained. Examples of the lithium-containing compound may include a lithium-transition-metal composite oxide and a lithium-transition-metal-phosphate compound. The lithium-transition-metal composite oxide is an oxide containing lithium (Li) and one or more transition metal elements as constituent elements. The lithium-transition-metal-phosphate compound is a phosphate compound containing lithium and one or more transition metal elements as constituent elements. In particular, it is preferable that the transition metal element be one or more of cobalt (Co), nickel (Ni), manganese (Mn), iron (Fe), and the like, since a higher voltage is obtained thereby. The chemical formula thereof may be expressed by, for example, $Li_xM1O_2$ or $Li_yM2PO_4$. In the formulas, M1 and M2 represent one or more transition metal elements. Values of x and y vary according to the charge and discharge state, and are generally in the range of $0.05 \leq x \leq 1.10$ and $0.05 \leq y \leq 1.10$.

Specific examples of the lithium-transition-metal composite oxide may include $LiCoO_2$, $LiNiO_2$, and a lithium-nickel-based composite oxide represented by the following Formula (20). Specific examples of the lithium-transition-metal-phosphate compound may include $LiFePO_4$ and $LiFe_{1-u}Mn_uPO_4(u<1)$, since thereby, a high battery capacity is obtained and superior cycle characteristics and the like are obtained as well.

$$LiNi_{1-z}M_zO_2 \qquad (20)$$

In Formula (20), M is one or more of cobalt (Co), manganese (Mn), iron (Fe), aluminum (Al), vanadium (V), tin (Sn), magnesium (Mg), titanium (Ti), strontium (Sr), calcium (Ca), zirconium (Zr), molybdenum (Mo), technetium (Tc), ruthenium (Ru), tantalum (Ta), tungsten (W), rhenium (Re), ytterbium (Yb), copper (Cu), zinc (Zn), barium (Ba), boron (B), chromium (Cr), silicon (Si), gallium (Ga), phosphorus (P), antimony (Sb), and niobium (Nb); and z satisfies $0.005<z<0.5$.

In addition thereto, the cathode material may be, for example, one or more of an oxide, a disulfide, a chalcogenide, an electrically-conductive polymer, and the like. Examples of the oxide may include titanium oxide, vanadium oxide, and manganese dioxide. Examples of the disulfide may include titanium disulfide and molybdenum sulfide. Examples of the chalcogenide may include niobium selenide. Examples of the electrically-conductive polymer may include sulfur, polyaniline, and polythiophene. However, the cathode material is not limited to one of the foregoing materials, and may be other material.

Examples of the cathode binder may include one or more of synthetic rubbers, polymer materials, and the like. Examples of the synthetic rubber may include a styrene-butadiene-based rubber, a fluorine-based rubber, and ethylene propylene diene. Examples of the polymer material may include polyvinylidene fluoride and polyimide.

Examples of the cathode electric conductor may include one or more of carbon materials and the like. Examples of the carbon materials may include graphite, carbon black, acetylene black, and Ketjen black. It is to be noted that the cathode electric conductor may be other material such as a metal material and an electrically-conductive polymer as long as the material has electric conductivity.

[Anode]

The anode 22 has an anode active material layer 22B on a single surface or both surfaces of an anode current collector 22A.

The anode current collector 22A may be made of, for example, an electrically-conductive material such as copper (Cu), nickel, and stainless steel. The surface of the anode current collector 22A may be preferably roughened. Thereby, due to a so-called anchor effect, adhesion characteristics of the anode active material layer 22B with respect to the anode current collector 22A are improved. In this case, it is enough that the surface of the anode current collector 22A in a region opposed to the anode active material layer 22B is roughened at minimum. Examples of roughening methods may include a method of forming fine particles by utilizing electrolytic treatment. The electrolytic treatment is a method of providing concavity and convexity on the surface of the anode current collector 22A by forming fine particles on the surface of the anode current collector 22A with the use of an electrolytic method in an electrolytic bath. A copper foil fabricated by an electrolytic method is generally called "electrolytic copper foil."

The anode active material layer 22B contains one or more of anode materials capable of inserting and extracting lithium ions as anode active materials, and may further contain one or more of other materials such as an anode binder and an anode electric conductor. Details of the anode binder and the anode electric conductor may be, for example, similar to those of the cathode binder and the cathode electric conductor. However, the chargeable capacity of the anode material may be preferably larger than the discharge capacity of the cathode 21 in order to prevent lithium metal from being unintentionally precipitated on the anode 22 in the middle of charge. That is, the electrochemical equivalent of the anode material capable of inserting and extracting lithium ions may be preferably larger than the electrochemical equivalent of the cathode 21.

The anode material may be, for example, one or more of carbon materials. In the carbon materials, crystal structure change at the time of insertion and extraction of lithium ions is extremely small. Therefore, the carbon materials provide high energy density and superior cycle characteristics. Further, the carbon materials function as anode electric conductors as well. Examples of the carbon materials may include graphitizable carbon, non-graphitizable carbon, and graphite. The spacing of (002) plane of the non-graphitizable carbon may be preferably equal to or greater than 0.37 nm, and the spacing of (002) plane of the graphite is equal to or smaller than 0.34 nm. More specifically, examples of the carbon materials may include pyrolytic carbons, cokes, glassy carbon fiber, an organic polymer compound fired body, activated carbon, and carbon blacks. Examples of the cokes may include pitch coke, needle coke, and petroleum coke. The organic polymer compound fired body is obtained by firing (carbonizing) a polymer compound such as a phenol resin and a furan resin at appropriate temperature. In addition thereto, examples of the carbon materials may include low crystalline carbon and amorphous carbon that are heat-treated at temperature of about 1000 deg C. or less. It is to be noted that the shape of any of the carbon materials may be any of a fibrous shape, a spherical shape, a granular shape, and a scale-like shape.

Further, the anode material may be, for example, a material (metal-based material) containing one or more of metal elements and metalloid elements as constituent elements, since higher energy density is thereby obtained. Such a metal-based material may be any of a simple substance, an alloy, and a compound, may be two or more thereof, or may be a material having one or more phases thereof in part or all thereof. It is to be noted that "alloy" includes a material containing one or more metal elements and one or more metalloid elements, in addition to a material configured of two or more metal elements. Further, the "alloy" may contain a non-metallic element. Examples of the structure thereof may include a solid solution, a eutectic crystal (eutectic mixture), an intermetallic compound, and a structure in which two or more thereof coexist.

Examples of the foregoing metal elements and the foregoing metalloid elements may include one or more of metal elements and metalloid elements that are capable of forming an alloy with lithium. Specific examples thereof may include Mg, B, Al, Ga, In, Si, Ge, Sn, Pb, Bi, Cd, Ag, Zn, Hf, Zr, Y, Pd, and Pt. In particular, Si, Sn, or both may be preferable. Si and Sn have a superior ability of inserting and extracting lithium ions, and therefore, provide high energy density.

A material containing Si, Sn, or both as constituent elements may be any of a simple substance, an alloy, and a compound of Si or Sn, may be two or more thereof, or may be a material having one or more phases thereof in part or all thereof. It is to be noted that, the term "simple substance" merely refers to a general simple substance (a small amount of impurity may be therein contained), and does not necessarily refer to a purity 100% simple substance.

The alloys of Si may contain, for example, one or more of elements such as Sn, Ni, Cu, Fe, Co, Mn, Zn, In, Ag, Ti, Ge, Bi, Sb, and Cr as constituent elements other than Si. The compounds of Si may contain, for example, one or more of C, O, and the like as constituent elements other than Si. It is to be noted that, for example, the compounds of Si may contain one or more of the elements described for the alloys of Si as constituent elements other than Si.

Specific examples of the alloys of Si and the compounds of Si may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq 2$), and LiSiO. It is to be noted that v in SiOv may be in the range of $0.2<v<1.4$.

The alloys of Sn may contain, for example, one or more of elements such as Si, Ni, Cu, Fe, Co, Mn, Zn, In, Ag, Ti, Ge, Bi, Sb, and Cr as constituent elements other than Sn. The compounds of Sn may contain, for example, one or more of elements such as C and O as constituent elements other than Sn. It is to be noted that the compounds of Sn may contain, for example, one or more of elements described for the alloys of Sn as constituent elements other than Sn. Specific examples of the alloys of Sn and the compounds of Sn may include $SnO_w$ ($0<w\leq 2$), $SnSiO_3$, LiSnO, and $Mg_2Sn$.

In particular, as a material containing Sn as a constituent element, for example, a material containing a second constituent element and a third constituent element in addition to Sn as a first constituent element may be preferable. Examples of the second constituent element may include one or more of elements such as Co, Fe, Mg, Ti, V, Cr, Mn, Ni, Cu, Zn, Ga, Zr, Nb, Mo, Ag, In, Ce, Hf, Ta, W, Bi, and Si. Examples of the third constituent element may include one or more of B, C, Al, P, and the like. In the case where the second constituent element and the third constituent element are contained, a high battery capacity, superior cycle characteristics, and the like are obtained.

In particular, a material (SnCoC-containing material) containing Sn, Co, and C as constituent elements may be preferable. In the SnCoC-containing material, for example, the C content may be from 9.9 mass % to 29.7 mass % both inclusive, and the ratio of Sn and Co contents (Co/(Sn+Co)) may be from 20 mass % to 70 mass % both inclusive, since high energy density is obtained thereby.

It is preferable that the SnCoC-containing material have a phase containing Sn, Co, and C. Such a phase may be preferably low-crystalline or amorphous. The phase is a reaction phase capable of reacting with lithium. Therefore, due to existence of the reaction phase, superior characteristics are obtained. The half bandwidth of the diffraction peak obtained by X-ray diffraction of the phase may be preferably equal to or greater than 1 deg based on diffraction angle of 2θ in the case where CuKα ray is used as a specific X ray, and the insertion rate is 1 deg/min. Thereby, lithium ions are more smoothly inserted and extracted, and reactivity with the electrolytic solution is decreased. It is to be noted that, in some cases, the SnCoC-containing material includes a phase containing a simple substance or part of the respective constituent elements in addition to the low-crystalline phase or the amorphous phase.

Whether or not the diffraction peak obtained by the X-ray diffraction corresponds to the reaction phase capable of reacting with lithium is allowed to be easily determined by comparison between X-ray diffraction charts before and after electrochemical reaction with lithium. For example, if the position of the diffraction peak after electrochemical reaction with lithium is changed from the position of the diffraction peak before the electrochemical reaction with lithium, the obtained diffraction peak corresponds to the reaction phase capable of reacting with lithium. In this case, for example, the diffraction peak of the low crystalline reaction phase or the amorphous reaction phase is seen in the range of 2θ=from 20 deg to 50 deg both inclusive. Such a reaction phase may have, for example, the foregoing respective constituent elements, and the low crystalline or amorphous structure thereof possibly results from existence of C mainly.

In the SnCoC-containing material, part or all of C as a constituent element may be preferably bonded to a metal element or a metalloid element as other constituent element, since cohesion or crystallization of Sn and/or the like is suppressed thereby. The bonding state of elements is allowed to be checked with the use, for example, of X-ray photoelectron spectroscopy (XPS). In a commercially available device, for example, as a soft X ray, Al-Kα ray, Mg-Kα ray, or the like may be used. In the case where part or all of C are bonded to a metal element, a metalloid element, or the like, the peak of a synthetic wave of 1s orbit of C (C1s) is shown in a region lower than 284.5 eV. It is to be noted that in the device, energy calibration is made so that the peak of 4f orbit of Au atom (Au4f) is obtained in 84.0 eV. At this time, in general, since surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of carbon in the SnCoC-containing material. Therefore, for example, analysis may be made with the use of commercially available software to isolate both peaks from each other. In the waveform analysis, the position of the main peak existing on the lowest bound energy side is the energy standard (284.8 eV).

It is to be noted that the SnCoC-containing material is not limited to the material configured of only Sn, Co, and C (SnCoC) as constituent elements. The SnCoC-containing material may further contain, for example, one or more of Si, Fe, Ni, Cr, In, Nb, Ge, Ti, Mo, Al, P, Ga, Bi, and the like as constituent elements in addition to Sn, Co, and C.

In addition to the SnCoC-containing material, a material containing Sn, Co, Fe, and C as constituent elements (SnCoFeC-containing material) may be also preferable. The composition of the SnCoFeC-containing material may be arbitrarily set. For example, the composition in which the Fe content may be set small is as follows. That is, the C content may be from 9.9 mass % to 29.7 mass % both inclusive, the Fe content may be from 0.3 mass % to 5.9 mass % both inclusive, and the ratio (Co/(Sn+Co)) of contents of Sn and Co may be from 30 mass % to 70 mass % both inclusive.

Further, the composition in which the Fe content is set large is as follows. That is, the C content may be from 11.9 mass % to 29.7 mass % both inclusive, the ratio ((Co+Fe)/(Sn+Co+Fe)) of contents of Sn, Co, and Fe may be from 26.4 mass % to 48.5 mass % both inclusive, and the ratio (Co/(Co+Fe)) of contents of Co and Fe may be from 9.9 mass % to 79.5 mass % both inclusive. In such a composition range, high energy density is obtained. It is to be noted that the physical properties (such as half bandwidth) of the SnCoFeC-containing material are similar to the physical properties of the foregoing SnCoC-containing material.

In addition thereto, the anode material may be, for example, one or more of metal oxides, polymer compounds, and the like. Examples of the metal oxides may include iron oxide, ruthenium oxide, and molybdenum oxide. Examples of the polymer compounds may include polyacetylene, polyaniline, and polypyrrole.

The anode active material layer 22B may be formed, for example, by one or more of a coating method, a vapor-phase deposition method, a liquid-phase deposition method, a spraying method, a firing method (sintering method), and the like. The coating method is a method in which, for example, after a particulate (powder) anode active material is mixed with an anode binder and/or the like, the mixture is dispersed in a solvent such as an organic solvent, and the anode current collector 22A is coated with the resultant. Examples of the vapor-phase deposition method may include a physical deposition method and a chemical deposition method. More specifically, examples thereof may include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase deposition method may include an electrolytic plating method and an electroless plating method. The spraying method is a method in which an anode active material in a fused state or a semi-fused state is sprayed to the anode current collector 22A. The firing method is a method in which after the anode current collector 22A is coated with a mixture diffused in a solvent with the use, for example, of a coating method, heat treatment is performed at temperature higher than the melting point of the anode binder and/or the like. Examples of the firing method may include an atmosphere firing method, a reactive firing method, and a hot press firing method.

In the secondary battery, as described above, in order to prevent lithium metal from being unintentionally precipitated on the anode 22 in the middle of charge, the electrochemical equivalent of the anode material capable of inserting and extracting lithium ions is larger than the electrochemical equivalent of the cathode. Further, in the case where the open circuit voltage (that is, a battery voltage) at the time of completely-charged state is equal to or greater than 4.25 V, the extraction amount of lithium ions per unit mass is larger than that in the case where the open circuit voltage is 4.20 V even if the same cathode active material is used. Therefore, amounts of the cathode active material and the anode active material are adjusted accordingly. Thereby, high energy density is obtainable.

[Separator]

The separator 23 separates the cathode 21 from the anode 22, and passes lithium ions while preventing current short circuit resulting from contact of both electrodes. The separator 23 may be, for example, a porous film made of one or more of a synthetic resin, ceramics, and the like. The separator 23 may be a laminated film in which two or more types of porous films are laminated. Examples of the synthetic resin may include polytetrafluoroethylene, polypropylene, and polyethylene.

In particular, the separator 23 may include, for example, a polymer compound layer on one surface or both surfaces of the foregoing porous film (base material layer). Thereby, adhesion characteristics of the separator 23 with respect to the cathode 21 and the anode 22 are improved, and therefore, skewness of the spirally wound electrode body 20 and the like are suppressed. Thereby, a decomposition reaction of the electrolytic solution is suppressed, and liquid leakage of the electrolytic solution with which the base material layer is impregnated is suppressed. Accordingly, even if charge and discharge are repeated, the resistance of the secondary battery is less likely to be increased, and battery swollenness is suppressed.

The polymer compound layer may contain, for example, a polymer material such as polyvinylidene fluoride, since such a polymer material has a superior physical strength and is electrochemically stable. However, the polymer material is not limited to polyvinylidene fluoride, and may be other material. In the case of forming the polymer compound layer, for example, after a solution in which the polymer material is dispersed or dissolved in an organic solvent or the like is prepared, the base material layer is coated with the solution, and the resultant is subsequently dried. Alternatively, the base material layer may be soaked in the solution and may be subsequently dried.

[Electrolytic Solution]

The separator 23 is impregnated with an electrolytic solution as a liquid electrolyte. The electrolytic solution contains a non-aqueous solvent, an electrolyte salt, and one or both of a disulfonyl compound represented by the following Formula (1) and a disulfinyl compound represented by the following Formula (2). However, the electrolytic solution may further contain other material such as an additive.

(1)

In Formula (1), R1 is one of a hydrocarbon group, a halogenated hydrocarbon group, an oxygen-containing hydrocarbon group, a halogenated oxygen-containing hydrocarbon group, and a group obtained by bonding two or more thereof to one another; and X1 is a halogen group.

(2)

In Formula (2), R2 is one of a hydrocarbon group, a halogenated hydrocarbon group, an oxygen-containing hydrocarbon group, a halogenated oxygen-containing hydrocarbon group, and a group obtained by bonding two or more thereof to one another; and X2 is a halogen group.

The disulfonyl compound represented by the following Formula (1) is tertiary amine having one non-hydrogen group (—R1) and two halogenated sulfonyl groups (—S(=O)$_2$—X1) as substituent groups. In contrast, the disulfinyl compound represented by the following Formula (2) is tertiary amine having one non-hydrogen group (—R2) and two halogenated sulfinyl groups (—S(=O)—X2) as substituent groups. As described above, the electrolytic solution may contain only one of the disulfonyl compound and the disulfinyl compound, or may contain both thereof.

One reason why the electrolytic solution contains one or both of the disulfonyl compound and the disulfinyl compound is that, in this case, chemical stability of the electrolytic solution is improved, and therefore, a decomposition reaction of the electrolytic solution is suppressed compared to in the case where the electrolytic solution does not contain any thereof. Thereby, even if the secondary battery is repeatedly charged and discharged, and conserved, lowering of the discharge capacity is suppressed, and therefore, a high discharge capacity is easily obtainable. Further, since gas generation due to a decomposition reaction of the electrolytic solution is suppressed, the secondary battery is less likely to be swollen. Such tendencies are particularly significant in the case where the secondary battery is charged and discharged and conserved under strict temperature environment such as high temperature.

In Formula (1) of the disulfonyl compound, type of R1 is not particularly limited as long as R1 is one of a hydrocarbon group, a halogenated hydrocarbon group, an oxygen-containing hydrocarbon group, a halogenated oxygen-containing hydrocarbon group, and a group obtained by bonding two or more thereof to one another. One reason for this is that, since in this case, the disulfonyl compound is tertiary amine having one non-hydrogen group and two halogenated sulfonyl groups, the foregoing advantage is obtainable without depending on the type of R1.

The term "hydrocarbon group" is a generic term used to refer to monovalent groups configured of carbon and hydrogen. The hydrocarbon group may have a straight-chain structure or a branched structure having one or more side chains. Further, the hydrocarbon group may be an unsaturated hydrocarbon group having a carbon-carbon multiple bond (a carbon-carbon double bond or a carbon-carbon triple bond), and may be a saturated hydrocarbon group not having a carbon-carbon multiple bond.

Examples of the hydrocarbon group may include an alkyl group, an alkenyl group, an alkynyl group, an aryl group, and a cycloalkyl group. The carbon numbers thereof are not particularly limited, since the foregoing advantage is obtainable without depending on the carbon numbers.

In particular, it may be preferable that the carbon number of an alkyl group be from 1 to 18 both inclusive, the carbon numbers of an alkenyl group and an alkynyl group be from 2 to 18 both inclusive, the carbon number of an aryl group be from 6 to 18 both inclusive, and the carbon number of a cycloalkyl group be from 3 to 18 both inclusive. One reason for this is that, in this case, the solubility, the compatibility, and the like of the disulfonyl compound are secured.

Examples of the alkyl group may include a methyl group (—$CH_3$), an ethyl group (—$C_2H_5$), and a propyl group (—$C_3H_7$), a hexyl group (—$C_6H_{13}$), an octyl group (—$C_8H_{16}$), a dodecyl group (—$C_{12}H_{25}$), and an octadecyl group (—$C_{18}H_{37}$). Examples of the alkenyl group may include a vinyl group (—CH=$CH_2$) and an allyl group (—$CH_2$—CH=$CH_2$). Examples of the alkynyl group may include an ethynyl group (—C≡CH). Examples of the aryl group may include a phenyl group and a naphtyl group. Examples of the cycloalkyl group may include a cyclopropyl group, a cyclobutyl group, a cyclopentyl group, a cyclohexyl group, a cycloheptyl group, and a cyclooctyl group.

The term "halogenated hydrocarbon group" refers to a group obtained by substituting (halogenating) part or all of hydrogen out of the hydrocarbon group by a halogen. The halogenated hydrocarbon group may contain only one type of halogen, and may contain two or more types of halogens. The types of halogens are not particularly limited, and may be, for example, one or more of fluorine (F), chlorine (Cl), bromine (Br), and iodine (I). In particular, fluorine may be preferable, since a higher effect is thereby obtained.

Examples of the halogenated hydrocarbon group may include a fluoromethyl group (—$CH_2F$), a trifluoromethyl group (—$CF_3$), a pentafluoroethyl group (—$C_2F_5$), and a heptafluoropropyl group (—$C_3F_7$).

The term "oxygen-containing hydrocarbon group" is a generic term used to refer to monovalent groups configured of oxygen together with carbon and hydrogen. The oxygen-containing hydrocarbon group may have a straight-chain structure or a branched structure, and may have or may not have a carbon-carbon multiple bond as the foregoing hydrocarbon group does.

Examples of the oxygen-containing hydrocarbon group may include an alkoxy group, a first ester group (—C(=O)—O—R3: R3 is an alkyl group), an ester carbonate group (—O—C(=O)—O—R4: R4 is an alkyl group), a second ester group (—O—C(=O)—R5: R5 is an alkyl group), and a polyether group (—(R6O)$_n$—R7: R6 is an alkylene group, R7 is an alkyl group, and n is an integer number equal to or more than 2). Each of carbon numbers thereof is not particularly limited. Specific examples of R3 to R5 and R7 (alkyl group) are similar to the foregoing specific examples of an alkyl group. Specific examples of R6 (alkylene group) may include a methylene group (—$CH_2$—), an ethylene group (—$C_2H_4$—), and a propylene group (—$C_3H_6$—). The carbon number of an alkylene group may be preferably from 1 to 18 both inclusive for a reason similar to that of an alkyl group.

In particular, the carbon number of an alkoxy group may be preferably from 1 to 18 both inclusive, since in this case, the solubility, the compatibility, and the like of the disulfonyl compound are secured.

Examples of the alkoxy group may include a methoxy group (—$OCH_3$), an ethoxy group (—$OC_2H_5$), and a propoxy group (—$OC_3H_7$). Examples of the first ester group may include —C(=O)—O—$CH_3$ and —C(=O)—O—$C_2H_5$. Examples of the ester carbonate group may include —O—C(=O)—O—$CH_3$ and —O—C(=O)—O—$C_2H_5$. Examples of the second ester group may include —O—C(=O)—$CH_3$ and —O—C(=O)—$C_2H_5$. Examples of the polyether group may include —($C_2H_4O$)$_2$—$CH_3$ and —($C_2H_4O$)$_2$—$C_2H_5$.

The term "halogenated oxygen-containing hydrocarbon group" refers to a group obtained by substituting (halogenating) part or all of hydrogen out of an oxygen-containing hydrocarbon group by a halogen. Details of types of halogens and the like are similar to those of the halogenated hydrocarbon group.

Examples of the halogenated oxygen-containing hydrocarbon group may include a trifluoromethoxy group (—$OCF_3$) and a pentafluoroethoxy group (—$OC_2F_5$).

The term "group obtained by bonding two or more thereof to one another" refers to a group obtained by bonding any two or more of the hydrocarbon group, the halogenated hydrocarbon group, the oxygen-containing hydrocarbon group, and the halogenated oxygen-containing hydrocarbon group that are described above to one another so that the valency becomes monovalent as a whole.

Although type of the group obtained by bonding two or more thereof is not particularly limited, examples thereof are as follows. Examples of a group (benzyl group) obtained by bonding an aryl group to an alkyl group may include —$CH_2$—$C_6H_5$. Examples of a group obtained by bonding a cycloalkyl group to an alkyl group may include —$CH_2$—$C_6H_{11}$. Examples of a group obtained by bonding an alkoxy group to an alkyl group may include —$CH_2$—$OCH_3$. Examples of a group obtained by bonding a first ester group to an alkyl group may include —$CH_2$—C(=O)—O—$CH_3$. Examples of a group obtained by bonding an ester carbonate group to an alkyl group may include —$CH_2$—O—C(=O)—O—$CH_3$, —$C_2H_4$—C(=O)—O—$CH_3$, and —$C_3H_6$—C(=O)—O—$CH_3$. Examples of a group obtained by bonding a second ester group to an alkyl group may include —$C_2H_4$—O—C(=O)—$CH_3$ and —$C_2H_4$—O—C(=O)—$C_2H_5$. Examples of a group obtained by bonding a polyether group to an alkyl group may include —$C_2H_4$—($C_2H_4O$)$_2$—$CH_3$ and —$C_2H_4$—($C_2H_4O$)$_2$—$C_2H_5$.

In addition thereto, R1 may be a group other than the foregoing groups. More specifically, R1 may be a derivative of any of the foregoing groups. The derivative is obtained by introducing one or more substituent groups to any of the foregoing groups, and any types of substituent groups may be introduced.

Type of X1 is not particularly limited, as long as X1 is a halogen group. One reason for this is that, since the disulfonyl compound is a tertiary amine having two halogenated sulfonyl groups, the foregoing advantage is obtainable without depending on the type of X1. It is to be noted that type of X1 included in one halogenated sulfonyl group and type of X1 included in the other halogenated sulfonyl group may be the same, or may be different from each other.

Types of halogen groups are similar to the types of halogens contained in the foregoing halogenated hydrocarbon group and the foregoing halogenated oxygen-containing hydrocarbon group. That is, examples of halogen groups may include one or more of a fluorine group, a chlorine group, a bromine group, and an iodine group.

In particular, a fluorine group may be preferable, since a higher effect is thereby obtained.

In Formula (2) of the disulfinyl compound, details of R2 are similar to those of R1 described above, and details of X2 are similar to those of X1 described above.

Specific examples of the disulfonyl compound may include one or more of compounds represented by the following Formula (1-1) to the following Formula (1-19). However, as long as the chemical formula represented by Formula (1) is satisfied, any compound other than the following compounds may be a specific example of the disulfonyl compound.

$CH_3$—N—($SO_2F$)$_2$ (1-1)

$C_2H_5$—N—($SO_2F$)$_2$ (1-2)

$C_3H_7$—N—($SO_2F$)$_2$ (1-3)

$CH_2$=CH—N—($SO_2F$)$_2$ (1-4)

CH≡C—N—($SO_2F$)$_2$ (1-5)

$C_6H_5$—N—($SO_2F$)$_2$ (1-6)

$C_6H_{11}$—N—($SO_2F$)$_2$ (1-7)

$CH_3$—C(=O)O—$C_2H_4$—N—($SO_2F$)$_2$ (1-8)

$CH_3$OC(=O)—$C_2H_4$—N—($SO_2F$)$_2$ (1-9)

$CH_3$OC(=O)O—$C_2H_4$—N—($SO_2F$)$_2$ (1-10)

$CH_3$OC(=O)O—$C_3H_6$—N—($SO_2F$)$_2$ (1-11)

$CF_3$—N—($SO_2F$)$_2$ (1-12)

$C_6H_5$—$CH_2$—N—($SO_2F$)$_2$ (1-13)

$CH_3$—N—($SO_2Cl$)$_2$ (1-14)

$CH_3$—N—($SO_2Br$)$_2$ (1-15)

$CH_3$—N—($SO_2I$)$_2$ (1-16)

$CH_3$O—$C_2H_4$—N—($SO_2F$)$_2$ (1-17)

$CH_3$—($OC_2H_4$)$_2$—N—($SO_2F$)$_2$ (1-18)

$CH_3$OC(=O)—N—($SO_2F$)$_2$ (1-19)

Specific examples of the disulfinyl compound may include one or more of compounds represented by Formula (2-1) to Formula (2-19) shown below. However, as long as the chemical formula represented by Formula (2) is satisfied, any compound other than the following compounds may be a specific example of the disulfinyl compound.

$CH_3$—N—(SOF)$_2$ (2-1)

$C_2H_5$—N—(SOF)$_2$ (2-2)

$C_3H_7$—N—(SOF)$_2$ (2-3)

$CH_2$=CH—N—(SOF)$_2$ (2-4)

CH≡C—N—(SOF)$_2$ (2-5)

$C_6H_5$—N—(SOF)$_2$ (2-6)

$C_6H_{11}$—N—(SOF)$_2$ (2-7)

$CH_3$—C(=O)O—$C_2H_4$—N—(SOF)$_2$ (2-8)

$CH_3$OC(=O)—$C_2H_4$—N—(SOF)$_2$ (2-9)

$CH_3$OC(=O)O—$C_2H_4$—N—(SOF)$_2$ (2-10)

$CH_3$OC(=O)O—$C_3H_6$—N—(SOF)$_2$ (2-11)

$CF_3$—N—(SOF)$_2$ (2-12)

$C_6H_5$—$CH_2$—N—(SOF)$_2$ (2-13)

$CH_3$—N—(SOCl)$_2$ (2-14)

$CH_3$—N—(SOBr)$_2$ (2-15)

$CH_3$—N—(SOI)$_2$ (2-16)

$CH_3$O—$C_2H_4$—N—(SOF)$_2$ (2-17)

$CH_3$—($OC_2H_4$)$_2$—N—(SOF)$_2$ (2-18)

$CH_3$OC(=O)—N—(SOF)$_2$ (2-19)

Although one or both contents of the disulfonyl compound and the disulfinyl compound in the electrolytic solution are not particularly limited, in particular, one or both contents thereof may be preferably from 0.0005 mass % to 8 mass % both inclusive, and may be more preferably from 0.001 mass % to 5 mass % both inclusive, since a higher effect is obtained thereby.

The non-aqueous solvent contains one or more of organic solvents and the like. Examples of the organic solvents may include a cyclic ester carbonate, a chain ester carbonate, lactone, a chain carboxylic ester, and nitrile, since thereby, a superior battery capacity, superior cycle characteristics, superior conservation characteristics, and the like are obtained. Examples of the cyclic ester carbonate may include ethylene carbonate, propylene carbonate, and butylene carbonate. Examples of the chain ester carbonate may include dimethyl carbonate, diethyl carbonate, ethyl methyl carbonate, and methylpropyl carbonate. Examples of the lactone may include γ-butyrolactone and γ-valerolactone. Examples of the carboxylic ester may include methyl acetate, ethyl acetate, methyl propionate, ethyl propionate, methyl butyrate, methyl isobutyrate, methyl trimethylacetate, and ethyl trimethylacetate. Examples of the nitrile may include acetonitrile, glutaronitrile, adiponitrile, methoxyacetonitrile, and 3-methoxypropionitrile.

In addition thereto, examples of the non-aqueous solvent may include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. Thereby, a similar advantage is obtained.

In particular, one or more of ethylene carbonate, propylene carbonate, dimethyl carbonate, diethyl carbonate, and ethyl methyl carbonate may be preferable, since thereby, a superior battery capacity, superior cycle characteristics, superior conservation characteristics, and the like are obtained. In this case, a combination of a high viscosity (high dielectric constant) solvent (for example, specific dielectric constant $\epsilon \geq 30$) such as ethylene carbonate and propylene carbonate and a low viscosity solvent (for example, viscosity $\leq 1$ mPa·s) such as dimethyl carbonate, ethylmethyl carbonate, and diethyl carbonate may be more preferable. One reason for this is that the dissociation property of the electrolyte salt and ion mobility are improved.

In particular, the non-aqueous solvent may preferably contain one or more of a first unsaturated cyclic ester carbonate represented by the following Formula (3), a second unsaturated cyclic ester carbonate represented by the following Formula (4), a third unsaturated cyclic ester carbonate represented by the following Formula (5), a halogenated cyclic ester carbonate represented by the following Formula (6), and a halogenated chain ester carbonate represented by the following Formula (7). One reason for this is that a stable protective film is formed mainly on the surface of the anode 22 at the time of charge and discharge, and therefore, a decomposition reaction of the electrolytic solution is suppressed.

Each of the first, the second, and the third unsaturated cyclic ester carbonates is a cyclic ester carbonate having one or more unsaturated bonds (carbon-carbon double bonds). More specifically, the first unsaturated cyclic ester carbonate is a vinylene-carbonate-based compound, and the second unsaturated cyclic ester carbonate is a vinylethylene-carbonate-based compound, and the third unsaturated cyclic ester carbonate is a methyleneethylene-carbonate-based compound. R11 and R12 in Formula (3) may be the same type of group, or may be groups different from each other. The same is similarly applied to R13 to R16 in Formula (4). It is to be noted that details of an alkyl group as an option for any of R11 to R16, R31, and R32 are similar to the foregoing details of the alkyl group of the disulfonyl compound and the disulfinyl compound.

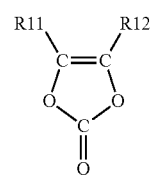

In Formula (3), each of R11 and R12 is one of a hydrogen group and an alkyl group.

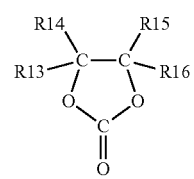

In Formula (4), each of R13 to R16 is one of a hydrogen group, an alkyl group, a vinyl group, and an allyl group, and one or more of R13 to R16 each are a vinyl group or an allyl group.

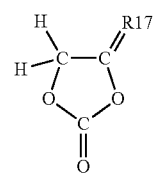

In Formula (5), R17 is >CR31R32, and each of R31 and R32 is an alkyl group.

Specific examples of the first unsaturated cyclic ester carbonate may include vinylene carbonate (1,3-dioxole-2-one), methylvinylene carbonate (4-methyl-1,3-dioxole-2-one), ethylvinylene carbonate (4-ethyl-1,3-dioxole-2-one), 4,5-dimethyl-1,3-dioxole-2-one, 4,5-diethyl-1,3-dioxole-2-one, 4-fluoro-1,3-dioxole-2-one, and 4-trifluoromethyl-1,3-dioxole-2-one. In particular, vinylene carbonate may be preferable, since vinylene carbonate is easily available and provides a high effect.

Specific examples of the second unsaturated cyclic ester carbonate may include vinylethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one. In particular, vinylethylene carbonate may be preferable, since vinylethylene carbonate is easily available, and provides a high effect. It goes without saying that all of R13 to R16 may be vinyl groups or allyl groups. Alternatively, some of R13 to R16 may be vinyl groups, and the others thereof may be allyl groups.

Specific examples of the third unsaturated cyclic ester carbonate may include methyleneethylene carbonate (4-methylene-1,3-dioxolane-2-one), 4,4-dimethyl-5-methylene-1,3-dioxolane-2-one, and 4,4-diethyl-5-methylene-1,3-dioxolane-2-one. The methyleneethylene-carbonate-based compound may be a compound having one methylene group as illustrated in Formula (5), or may be a compound having two methylene groups.

In addition thereto, catechol carbonate having a benzene ring may be used instead of any of the first, the second, and the third unsaturated cyclic ester carbonates.

One or more contents of the first, the second, and the third unsaturated cyclic ester carbonates in the non-aqueous solvent are not particularly limited, and may be, for example, from 0.01 wt % to 10 wt % both inclusive. It is to be noted that, specific examples of the first, the second, and the third unsaturated cyclic ester carbonates may include compounds other than the foregoing compounds.

The halogenated cyclic ester carbonate is a cyclic ester carbonate including one or more halogens as constituent elements. The halogenated chain ester carbonate is a chain ester carbonate including one or more halogen groups as constituent elements. R21 to R24 in Formula (6) may be the same type of group, or may be groups different from one another. It goes without saying that part of R21 to R24 may be the same type of group. The same is similarly applied to R25 to R30 in Formula (7). It is to be noted that details of a halogen group, an alkyl group, and a halogenated alkyl group as options for any of R21 to R30 are similar to the foregoing details of the halogen group and the like of the disulfonyl compound and the disulfinyl compound. That is, types of the halogen group may be preferably one or more of a fluorine group, a chlorine group, a bromine group, and an iodine group, and fluorine may be more preferable. However, the number of halogens may be more preferably two than one, and further may be three or more. One reason for this is that, since in this case, a protective film is easily formed, a more rigid and more stable protective film is formed.

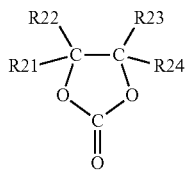

(6)

In Formula (6), each of R21 to R24 is one of a hydrogen group, a halogen group, an alkyl group, and a halogenated alkyl group; and one or more of R21 to R24 are each one of a halogen group and a halogenated alkyl group.

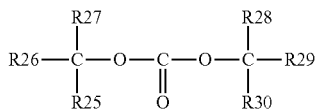

(7)

In Formula (7), each of R25 to R30 is one of a hydrogen group, a halogen group, an alkyl group, and a halogenated alkyl group; and one or more of R25 to R30 are each a halogen group or a halogenated alkyl group.

Specific examples of the halogenated cyclic ester carbonate may include one or more of compounds represented by the following Formula (6-1) to the following Formula (6-21). Such compounds include a geometric isomer. In particular, 4-fluoro-1,3-dioxolane-2-one represented by Formula (6-1) and 4,5-difluoro-1,3-dioxolane-2-one represented by Formula (6-3) may be preferable. Further, as 4,5-difluoro-1,3-dioxolane-2-one, a trans isomer may be more preferable than a cis isomer, since the trans isomer is easily available and provides a high effect.

(6-1)

(6-2)

(6-3)

(6-4)

(6-5)

(6-6)

(6-7)

(6-8)

(6-9)

(6-10) 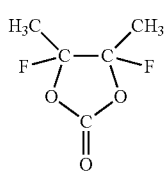

(6-11) 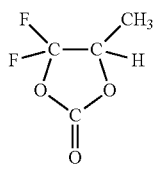

(6-12) 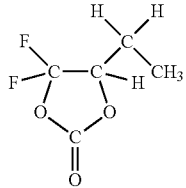

(6-13) 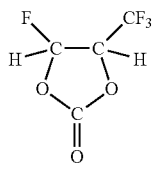

(6-14) 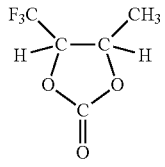

(6-15) 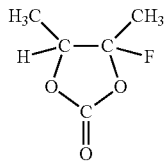

(6-16) 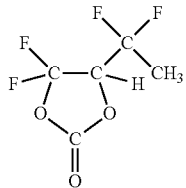

(6-17) 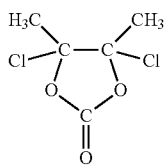

(6-18) 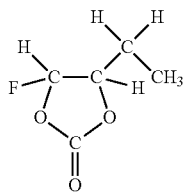

(6-19) 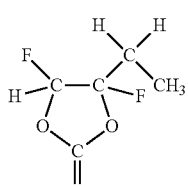

(6-20) 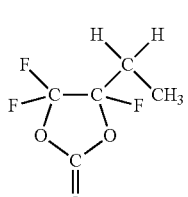

(6-21) 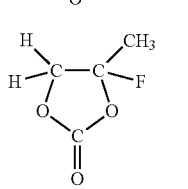

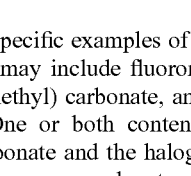

Specific examples of the halogenated chain ester carbonate may include fluoromethyl methyl carbonate, bis (fluoromethyl) carbonate, and difluoromethyl methyl carbonate.

One or both contents of the halogenated cyclic ester carbonate and the halogenated chain ester carbonate in the non-aqueous solvent are not particularly limited, and may be, for example, from 0.01 wt % to 50 wt % both inclusive. It is to be noted that, specific examples of the halogenated cyclic ester carbonate and the halogenated chain ester carbonate may include compounds other than the foregoing compounds.

Further, the non-aqueous solvent may preferably contain one or more of sultones (cyclic sulfonic esters), since the chemical stability of the electrolytic solution is more improved thereby. Specific examples of the sultones may include propane sultone and propene sultone. The sultone content in the non-aqueous solvent is not particularly limited, and may be, for example, from 0.5 wt % to 5 wt % both inclusive. Specific examples of the sultones may include compounds other than the foregoing compounds.

Further, the non-aqueous solvent may preferably contain one or more acid anhydrides since the chemical stability of the electrolytic solution is thereby further improved. Specific examples of the acid anhydrides may include a carboxylic anhydride, a disulfonic anhydride, and a carboxylic acid sulfonic acid anhydride. More specifically, examples of the carboxylic anhydride may include a succinic anhydride, a glutaric anhydride, and a maleic anhydride. Examples of the disulfonic anhydride may include an ethane disulfonic anhydride and a propane disulfonic anhydride. Examples of the carboxylic acid sulfonic acid anhydride may include a sulfobenzoic anhydride, a sulfopropionic anhydride, and a sulfobutyric anhydride. The content of the acid anhydride in the non-aqueous solvent is not particularly limited, and may be, for example, from 0.5 wt % to 5 wt % both inclusive. It is to be noted that specific examples of the acid anhydrides may include compounds other than the foregoing compounds.

The electrolyte salt may contain, for example, one or more of lithium salts. However, the electrolyte salt may contain, for example, a salt other than the lithium salt.

Examples of "the salt other than the lithium salt" may include a light metal salt other than the lithium salt.

Examples of the lithium salts may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). Thereby, a superior battery capacity, superior cycle characteristics, superior conservation characteristics, and the like are obtained. However, specific examples of the lithium salts may include compounds other than the foregoing compounds.

In particular, one or more of $LiPF_6$, $LiBF_4$, $LiClO_4$, and $LiAsF_6$ may be preferable, and $LiPF_6$ may be more preferable, since the internal resistance is thereby lowered, and therefore, a higher effect is obtained.

In particular, the electrolyte salt may preferably contain one or more of a compound represented by the following Formula (8), a compound represented by Formula (9), and a compound represented by Formula (10), since a higher effect is obtainable thereby. It is to be noted that R41 and R43 in Formula (8) may be the same type of group, or may be groups different from each other. The same is applied to R51 to R53 in Formula (9) and R61 and R62 in Formula (10). It goes without saying that part of R51 to R53 may be the same type of group.

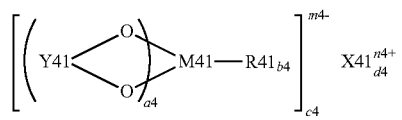

(8)

In Formula (8), X41 is one of Group 1 elements, Group 2 elements in the long-period periodic table, and aluminum; M41 is one of transition metals, Group 13 elements, Group 14 elements, and Group 15 elements in the long-period periodic table; R41 is a halogen group; Y41 is one of —C(=O)—R42-C(=O)—, —C(=O)—$CR43_2$-, and —C(=O)—C(=O)—; R42 is one of an alkylene group, a halogenated alkylene group, an arylene group, and a halogenated arylene group; R43 is one of an alkyl group, a halogenated alkyl group, an aryl group, and a halogenated aryl group; a4 is one of integer numbers 1 to 4 both inclusive; b4 is one of integer numbers 0, 2, and 4; and each of c4, d4, m4, and n4 is one of integer numbers 1 to 3 both inclusive.

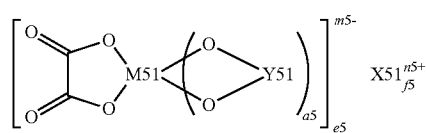

(9)

In Formula (9), X51 is one of Group 1 elements and Group 2 elements in the long-period periodic table; M51 is one of transition metals, Group 13 elements, Group 14 elements, and Group 15 elements in the long-period periodic table; Y51 is one of —C(=O)—$(CR51_2)_{b5}$-C(=O)—, —$R53_2$C—$(CR52_2)_{c5}$—C(=O)—, —$R53_2$C—$(CR52_2)_{c5}$—$R53_2$—, —$R53_2$C—$(CR52_2)_{c5}$-S(=O)$_2$—, —S(=O)$_2$—$(CR52_2)_{d5}$—S(=O)$_2$—, and —C(=O)—$(CR52_2)_{d5}$-S(=O)$_2$—; each of R51 and R53 is one of a hydrogen group, an alkyl group, a halogen group, and a halogenated alkyl group; one or more of R51 and R53 are each the halogen group or the halogenated alkyl group; R52 is one of a hydrogen group, an alkyl group, a halogen group, and a halogenated alkyl group; each of a5, e5, and n5 is one of integer numbers 1 and 2; each of b5 and d5 is one of integer numbers 1 to 4 both inclusive; c5 is one of integer numbers 0 to 4 both inclusive; and each of f5 and m5 is one of integer numbers 1 to 3 both inclusive.

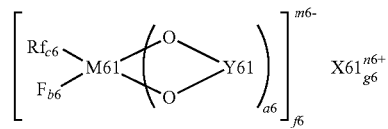

(10)

In Formula (10), X61 is one of Group 1 elements and Group 2 elements in the long-period periodic table; M61 is one of transition metals, Group 13 elements, Group 14 elements, and Group 15 elements in the long-period periodic table; Rf is one of a fluorinated alkyl group with carbon number from 1 to 10 both inclusive and a fluorinated aryl group with carbon number from 1 to 10 both inclusive; Y61 is one of —C(=O)—$(CR61_2)_{d6}$-C(=O)—, —$R62_2$C—$(CR61_2)_{d6}$-C(=O)—, —$R62_2$C—$(CR61_2)_{d6}$-$CR62_2$—, —$R62_2$C—$(CR61_2)_{d6}$-S(=O)$_2$—, —S(=O)$_2$—$(CR61_2)_{e6}$-S(=O)$_2$—, and —C(=O)—$(CR61_2)_{e6}$-S(=O)$_2$—; R61 is one of a hydrogen group, an alkyl group, a halogen group, and a halogenated alkyl group; R62 is one of a hydrogen group, an alkyl group, a halogen group, and a halogenated alkyl group, and one or more thereof are each a halogen group or a halogenated alkyl group; each of a6, f6, and n6 is one of integer numbers 1 and 2; each of b6, c6, and e6 is one of integer numbers 1 to 4 both inclusive; d6 is one of integer numbers 0 to 4 both inclusive; and each of g6 and m6 is one of integer numbers 1 to 3 both inclusive.

It is to be noted that Group 1 elements include H, Li, Na, K, Rb, Cs, and Fr. Group 2 elements include Be, Mg, Ca, Sr, Ba, and Ra. Group 13 elements include B, Al, Ga, In, and Tl. Group 14 elements include C, Si, Ge, Sn, and Pb. Group 15 elements include N, P, As, Sb, and Bi.

Specific examples of the compound represented by Formula (8) may include one or more of compounds represented by the following Formula (8-1) to the following Formula (8-6) and the like. Specific examples of the compound represented by Formula (9) may include one or more of compounds represented by the following Formula (9-1) to the following Formula (9-8) and the like. Specific examples of the compound represented by Formula (10) may include one or more of a compound represented by the following Formula (10-1) and the like. However, examples of the compounds represented by Formula (8) to Formula (10) may include compounds other than the foregoing specific examples.

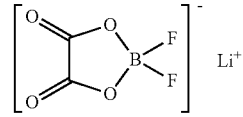

(8-1)

-continued (8-2) 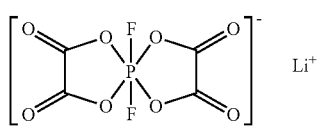

(8-3) 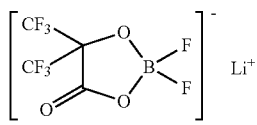

(8-4) 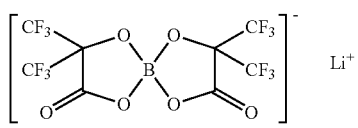

(8-5) 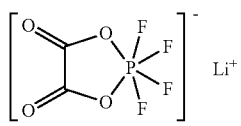

(8-6) 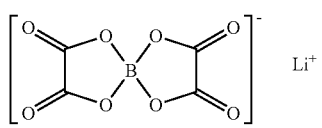

(9-1) 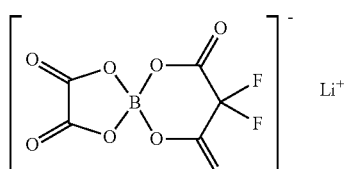

(9-2) 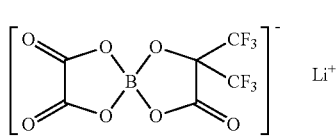

(9-3) 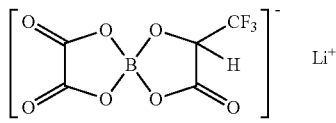

(9-4) 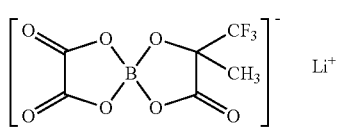

(9-5) 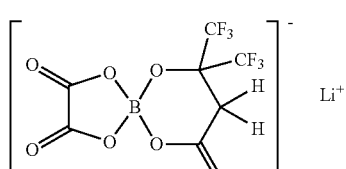

-continued (9-6) 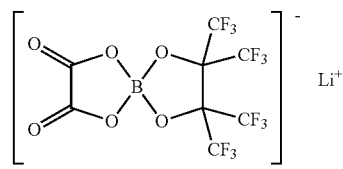

(9-7) 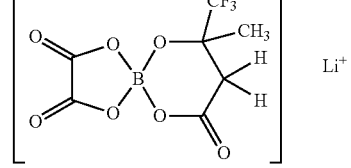

(9-8) 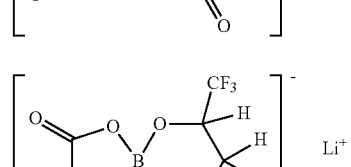

(10-1) 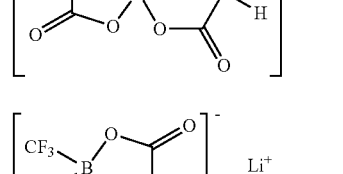

Further, the electrolyte salt may preferably contain one or more of a chain imide compound represented by the following Formula (11), a cyclic imide compound represented by Formula (12), and a chain methyde compound represented by Formula (13), since a higher effect is obtained thereby. m and n in Formula (11) may be the same value or values different from each other. The same is similarly applied to p, q, and r in Formula (13).

$$\text{LiN}(C_mF_{2m+1}SO_2)(C_nF_{2n+1}SO_2) \tag{11}$$

In Formula (11), each of m and n is an integer number equal to or greater than 0.

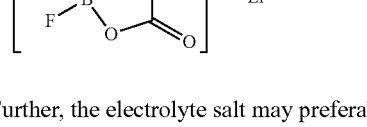

(12)

In Formula (12), R71 is a straight-chain or branched perfluoro alkylene group with carbon number from 2 to 4 both inclusive.

$$\text{LiC}(C_pF_{2p+1}SO_2)(C_qF_{2q+1}SO_2)(C_rF_{2r-1}SO_2) \tag{13}$$

In Formula (13), each of p, q, and r is an integer number equal to or greater than 1.

In the case of m≠0 and n≠0, specific examples of the chain imide compound may include one or more of lithium bis(trifluoromethanesulfonyl)imide (LiN(CF$_3$SO$_2$)$_2$), lithium bis(pentafluoroethanesulfonyl)imide (LiN(C$_2$F$_5$SO$_2$)$_2$), lithium (trifluoromethanesulfonyl)(pentafluoroethanesulfonyl)imide (LiN(CF$_3$SO$_2$)(C$_2$F$_5$SO$_2$)), lithium(trifluoromethanesulfonyl)(heptafluoropropanesulfonyl)imide (LiN(CF$_3$SO$_2$)(C$_3$F$_7$SO$_2$)), and lithium(trifluoromethane-sulfonyl)(nonafluorobutanesulfonyl)imide (LiN(CF$_3$SO$_2$)(C$_4$F$_9$SO$_2$)). In the case of m=0 and n=0, specific examples of the chain imide compound may include lithium bis(fluorosulfonyl)imide (LiN(FSO$_2$)$_2$).

Specific examples of the cyclic imide compound may include one or more of compounds represented by Formula (12-1) to Formula (12-4) and the like.

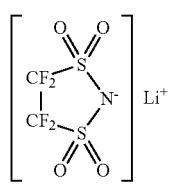
(12-1)

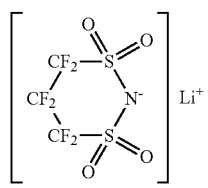
(12-2)

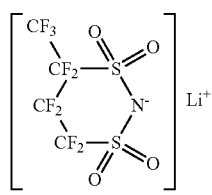
(12-3)

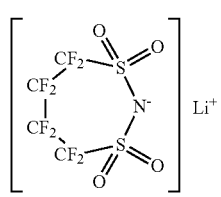
(12-4)

Specific examples of the chain methyde compound may include lithium tris(trifluoromethanesulfonyl)methyde (LiC(CF$_3$SO$_2$)$_3$) and the like.

In particular, the electrolyte salt may preferably contain lithium bis(fluorosulfonyl)imide, since, in this case, a discharge reaction of the electrolytic solution is suppressed, and therefore, even if a secondary battery is repeatedly charged and discharged, the discharge capacity is less likely to be lowered, and gas is less likely to be generated.

Although the content of the electrolyte salt is not particularly limited, in particular, the content thereof may be preferably from 0.3 mol/kg to 3.0 mol/kg both inclusive with respect to the non-aqueous solvent, since high ion conductivity is obtained thereby.

[Operation of Secondary Battery]

The secondary battery may operate, for example, as follows. At the time of charge, lithium ions extracted from the cathode 21 are inserted in the anode 22 through the electrolytic solution. In contrast, at the time of discharge, lithium ions extracted from the anode 22 are inserted in the cathode 21 through the electrolytic solution.

[Method of Manufacturing Secondary Battery]

The secondary battery may be manufactured, for example, by the following procedure.

First, the cathode 21 is fabricated. In this example, a cathode active material is mixed with a cathode binder, a cathode electric conductor, and the like to prepare a cathode mixture. Subsequently, the cathode mixture is dispersed in an organic solvent or the like to obtain paste cathode mixture slurry. Subsequently, both surfaces of the cathode current collector 21A are coated with the cathode mixture slurry, which is dried to form the cathode active material layer 21B. Thereafter, the cathode active material layer 21B may be compression-molded with the use of a roll pressing machine and/or the like. In this case, compression-molding may be performed while heating the cathode active material layer 21B, or compression-molding may be repeated several times.

Further, the anode 22 is fabricated by a procedure similar to that of the cathode 21 described above. In this example, an anode active material is mixed with an anode binder, an anode electric conductor, and the like to prepare an anode mixture, which is subsequently dispersed in an organic solvent or the like to form paste anode mixture slurry. Subsequently, both surfaces of the anode current collector 22A are coated with the anode mixture slurry, which is dried to form the anode active material layer 22B. Thereafter, the anode active material layer 22B may be compression-molded.

Further, an electrolytic solution is prepared. In this example, after an electrolyte salt is dispersed in a non-aqueous solvent, one or both of a disulfonyl compound and a disulfinyl compound are added thereto.

Finally, the secondary battery is assembled with the use of the cathode 21 and the anode 22. In this example, the cathode lead 25 is attached to the cathode current collector 21A with the use of a welding method and/or the like, and the anode lead 26 is attached to the anode current collector 22A with the use of a welding method and/or the like. Subsequently, the cathode 21 and the anode 22 are layered with the separator 23 in between and are spirally wound, and thereby, the spirally wound electrode body 20 is fabricated. Thereafter, the center pin 24 is inserted in the center of the spirally wound electrode body 20. Subsequently, the spirally wound electrode body 20 is sandwiched between the pair of insulating paltes 12 and 13, and is contained in the battery can 11. In this example, the cathode lead 25 is attached to the safety valve mechanism 15 with the use of a welding method and/or the like, and the anode lead 26 is attached to the battery can 11 with the use of a welding method and/or the like. Subsequently, the electrolytic solution is injected into the battery can 11, and the separator 23 is impregnated with the electrolytic solution. Finally, at the open end of the battery can 11, the battery cover 14, the safety valve mechanism 15, and the PTC device 16 are fixed by being swaged with the gasket 17. Accordingly, the secondary battery is completed.

[Function and Effect of Secondary Battery]

According to the cylindrical-type secondary battery, the electrolytic solution contains one or both of the disulfonyl compound and the disulfinyl compound. Thereby, as described above, compared to in a case in which an electrolytic solution does not contain one or both of the disulfonyl compound and the disulfinyl compound, and in a case in which an electrolytic solution contains other compound, chemical stability of the electrolytic solution is improved, and therefore, a decomposition reaction of the electrolytic solution is suppressed. Examples of "other compound" may include other disulfonyl compounds represented by the following Formula (14-1) and Formula (14-2) and other disulfinyl compounds represented by the following Formula (14-3) and Formula (14-4). Therefore, even if the secondary battery is charged and discharged, and conserved, the discharge capacity is less likely to be lowered, and the secondary battery is less likely to be swollen, and accordingly, superior battery characteristics are obtainable.

(14-1)

(14-2)

(14-3)

(14-4)

In particular, in the case where each of X1 in Formula (1) and X2 in Formula (2) is a fluorine group, higher effects are obtainable. Further, in the case where one or both contents of the disulfonyl compound and the disulfinyl compound in the electrolytic solution are from 0.0005 mass % to 8 mass % both inclusive, more particularly from 0.001 mass % to 5 mass % both inclusive, higher effects are obtainable.

Further, in the case where the electrolytic solution contains one or more of the first, the second, and the third unsaturated cyclic ester carbonates, the halogenated cyclic ester carbonate, and the halogenated chain ester carbonate, lowering of the discharge capacity is allowed to be further suppressed. Further, in the case where the electrolyte salt contains lithium bis(fluorosulfonyl)imide, lowering of the discharge capacity is allowed to be further suppressed, and swollenness of the secondary battery is allowed to be further suppressed.

[1-2. Lithium Ion Secondary Battery (Laminated Film Type)]

Figure 3:
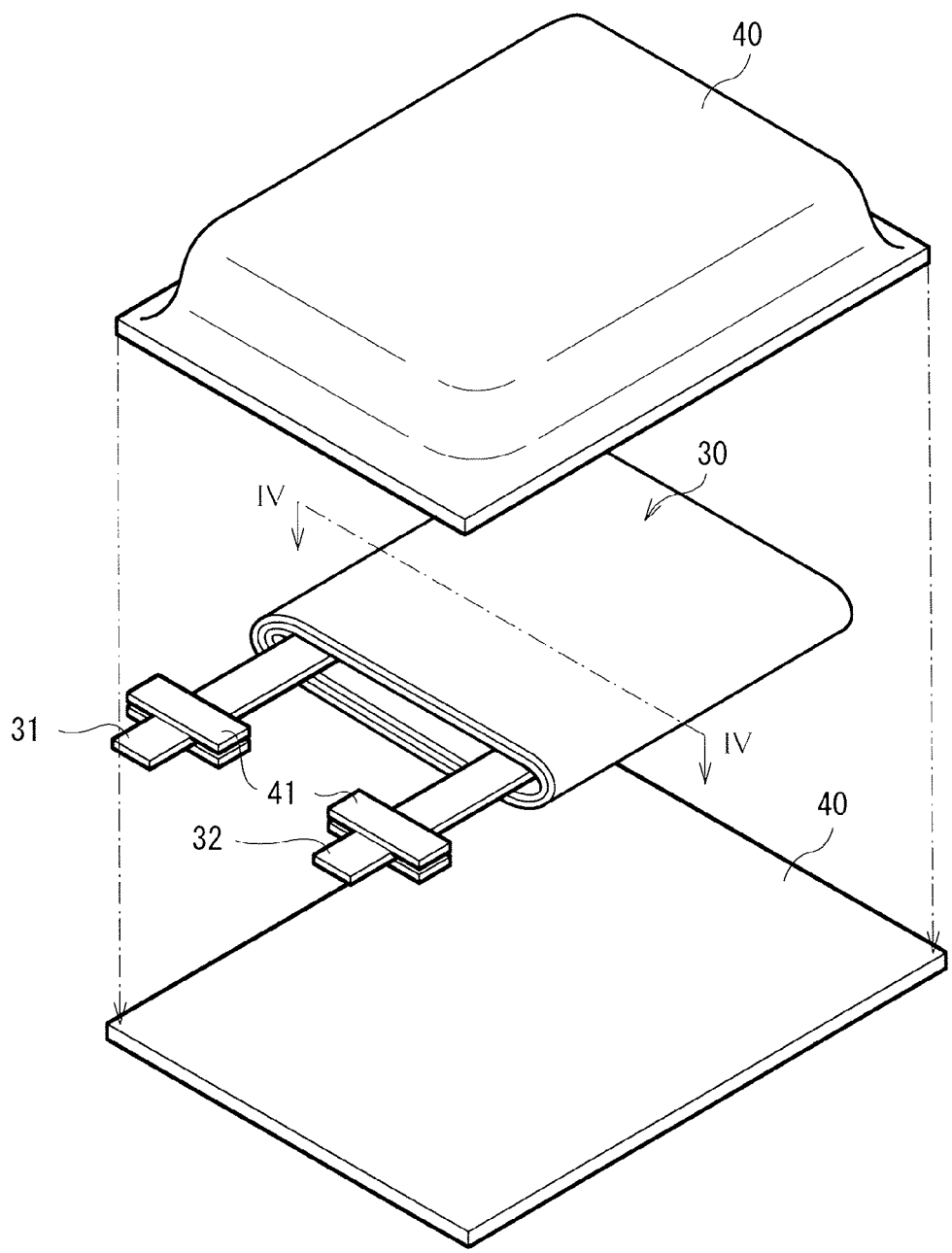
FIG. 3 is a perspective view illustrating a configuration of another non-aqueous secondary battery (laminated film type) including the electrolytic solution according to the embodiment of the present technology.
Figure 4:
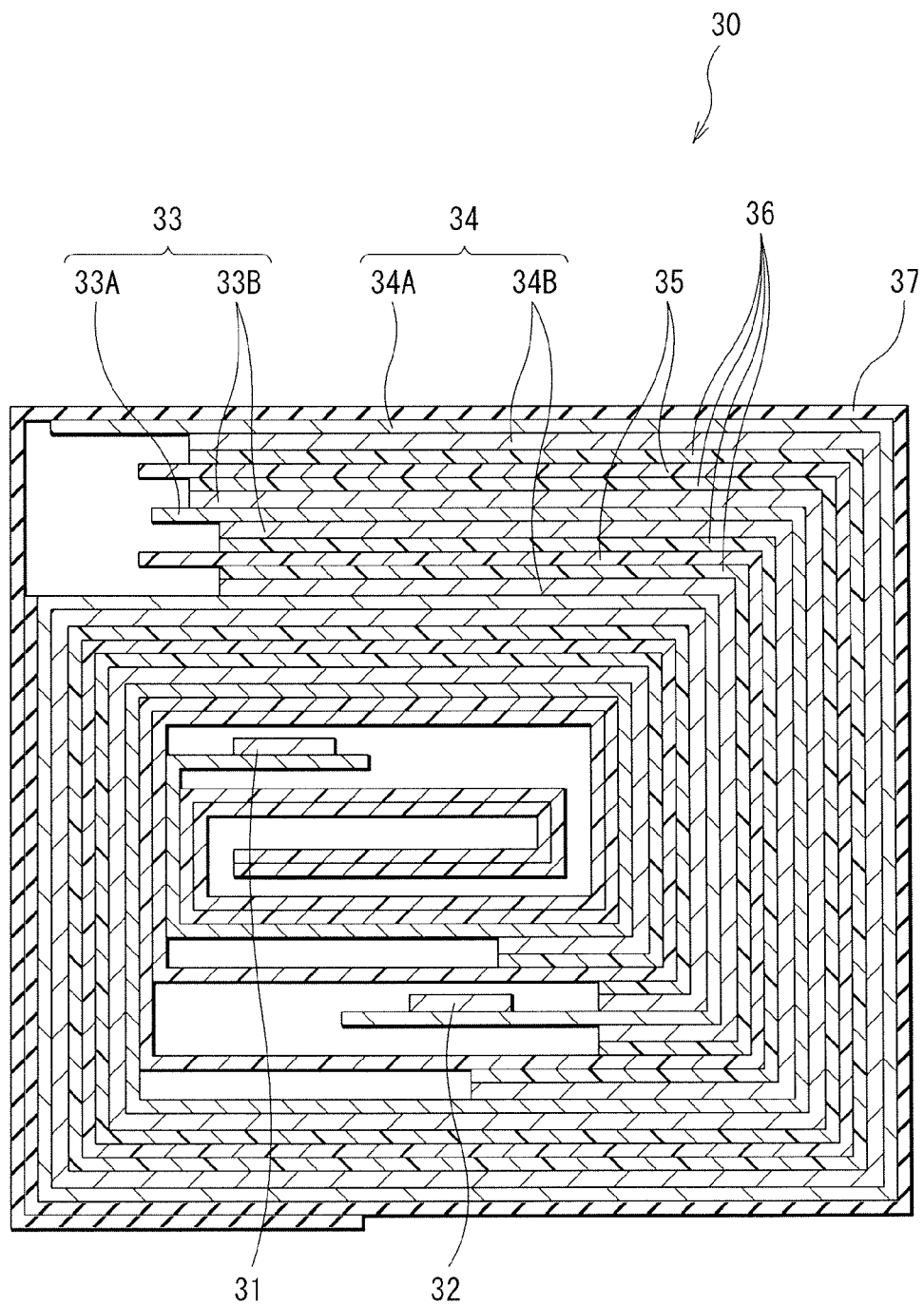
FIG. 4 is a cross-sectional view taken along a line IV-IV of a spirally wound electrode body illustrated in FIG. 3.

FIG. 3 illustrates an exploded perspective configuration of another secondary battery. FIG. 4 illustrates an enlarged cross-section taken along a line IV-IV of a spirally wound electrode body 30 illustrated in FIG. 3. In the following description, the elements of the cylindrical-type secondary battery described above will be used as necessary.

[Whole Configuration of Secondary Battery]

The secondary battery described here may be, for example, a so-called laminated-film-type lithium ion secondary battery. For example, in the secondary battery, the spirally wound electrode body 30 may be contained in a film-like outer package member 40. The spirally wound electrode body 30 is formed by laminating a cathode 33 and an anode 34 with a separator 35 and an electrolyte layer 36 in between, and subsequently spirally winding the resultant laminated body. A cathode lead 31 is attached to the cathode 33, and an anode lead 32 is attached to the anode 34. The outermost periphery of the spirally wound electrode body 30 is protected by a protective tape 37.

The cathode lead 31 and the anode lead 32 may be, for example, led out from inside to outside of the outer package member 40 in the same direction. The cathode lead 31 may be made of, for example, an electrically-conductive material such as aluminum, and the anode lead 32 may be made of, for example, an electrically-conducive material such as copper, nickel, and stainless steel. These electrically-conductive materials may be in the shape of, for example, a thin plate or mesh.

The outer package member 40 may be a laminated film in which, for example, a fusion bonding layer, a metal layer, and a surface protective layer are laminated in this order. The outer package member 40 may be formed by, for example, layering two laminated films so that the fusion bonding layers and the spirally wound electrode body 30 are opposed to each other, and subsequently fusion-bonding the respective outer edges of the fusion bonding layers to each other. Alternatively, the two laminated films may be attached to each other by an adhesive or the like. Examples of the fusion bonding layer may include a film made of polyethylene, polypropylene, or the like. Examples of the metal layer may include an aluminum foil. Examples of the surface protective layer may include a film made of nylon, polyethylene terephthalate, or the like.

In particular, as the outer package member 40, an aluminum laminated film in which a polyethylene film, an aluminum foil, and a nylon film are laminated in this order may be preferable. However, the outer package member 40 may be made of a laminated film having other laminated structure, a polymer film such as polypropylene, or a metal film.

An adhesive film 41 to protect from outside air intrusion is inserted between the outer package member 40 and the cathode lead 31 and between the outer package member 40 and the anode lead 32. The adhesive film 41 is made of a material having adhesion characteristics with respect to the cathode lead 31 and the anode lead 32. Examples of the material having adhesion characteristics may include a polyolefin resin. More specific examples thereof may include polyethylene, polypropylene, modified polyethylene, and modified polypropylene.

The cathode 33 may have, for example, a cathode active material layer 33B on a single surface or both surfaces of a cathode current collector 33A. The anode 34 may have, for example, an anode active material layer 34B on a single surface or both surfaces of an anode current collector 34A. The configurations of the cathode current collector 33A, the cathode active material layer 33B, the anode current collector 34A, and the anode active material layer 34B are similar to the configurations of the cathode current collector 21A, the cathode active material layer 21B, the anode current collector 22A, and the anode active material layer 22B, respectively. Further, the configuration of the separator 35 is similar to the configuration of the separator 23.

In the electrolyte layer 36, an electrolytic solution is supported by a polymer compound. The electrolyte layer 36 is a so-called gel electrolyte, since thereby, high ion conductivity (for example, 1 mS/cm or more at room temperature) is obtained and liquid leakage of the electrolytic solution is prevented. The electrolyte layer 36 may contain other material such as an additive.

The polymer compound contains one or more of polymer materials. Examples of the polymer materials may include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. In addition thereto, examples of the polymer materials may include a copolymer. Examples of the copolymer may include a copolymer of vinylidene fluoride and hexafluoro propylene. In particular, polyvinylidene fluoride or the copolymer of vinylidene fluoride and hexafluoro propylene may be preferable, and polyvinylidene fluoride may be more preferable, since such a polymer compound is electrochemically stable.

The composition of the electrolytic solution is similar to the composition of the electrolytic solution of the cylindrical-type secondary battery. The electrolytic solution contains one or both of the foregoing disulfonyl compound and the foregoing disulfinyl compound. However, in the electrolyte layer 36 as a gel electrolyte, the term "solvent" of the electrolytic solution refers to a wide concept including not only a liquid solvent but also a material having ion conductivity capable of dissociating the electrolyte salt. Therefore, in the case where a polymer compound having ion conductivity is used, the polymer compound is also included in the solvent.

It is to be noted that the electrolytic solution may be used as it is instead of the gel electrolyte layer 36. In this case, the separator 35 is impregnated with the electrolytic solution.

[Operation of Secondary Battery]

The secondary battery may operate, for example, as follows. At the time of charge, lithium ions extracted from the cathode 33 are inserted in the anode 34 through the electrolyte layer 36. In contrast, at the time of discharge, lithium ions extracted from the anode 34 are inserted in the cathode 33 through the electrolyte layer 36.

[Method of Manufacturing Secondary Battery]

The secondary battery including the gel electrolyte layer 36 may be manufactured, for example, by the following three types of procedures.

In the first procedure, the cathode 33 and the anode 34 are fabricated by a fabrication procedure similar to that of the cathode 21 and the anode 22. In this case, the cathode active material layer 33B is formed on both surfaces of the cathode current collector 33A to form the cathode 33, and the anode active material layer 34B is formed on both surfaces of the anode current collector 34A to form the anode 34. Subsequently, a precursor solution including an electrolytic solution, a polymer compound, and a solvent such as an organic solvent is prepared. Thereafter, the cathode 33 and the anode 34 are coated with the precursor solution to form the gel electrolyte layer 36. Subsequently, the cathode lead 31 is attached to the cathode current collector 33A with the use of a welding method and/or the like, and the anode lead 32 is attached to the anode current collector 34A with the use of a welding method and/or the like similarly. Subsequently, the cathode 33 and the anode 34 are layered with the separator 35 in between and are spirally wound to fabricate the spirally wound electrode body 30. Thereafter, the protective tape 37 is adhered to the outermost periphery thereof. Subsequently, after the spirally wound electrode body 30 is sandwiched between two pieces of film-like outer package members 40, the outer edges of the outer package members 40 are bonded with the use of a thermal fusion bonding method and/or the like. Thereby, the spirally wound electrode body 30 is enclosed into the outer package members 40. In this case, the adhesive films 41 are inserted between the cathode lead 31 and the outer package member 40 and between the anode lead 32 and the outer package member 40.

In the second procedure, the cathode lead 31 is attached to the cathode 33, and the anode lead 32 is attached to the anode 34. Subsequently, the cathode 33 and the anode 34 are layered with the separator 35 in between and are spirally wound to fabricate a spirally wound body as a precursor of the spirally wound electrode body 30. Thereafter, the protective tape 37 is adhered to the outermost periphery thereof. Subsequently, after the spirally wound body is sandwiched between two pieces of the film-like outer package members 40, the outermost peripheries except for one side are bonded with the use of a thermal fusion bonding method and/or the like to obtain a pouched state, and the spirally wound body is contained in the pouch-like outer package member 40. Subsequently, an electrolytic solution, a monomer as a raw material for the polymer compound, a polymerization initiator, and other materials such as a polymerization inhibitor are mixed to prepare a composition for electrolyte. Subsequently, the composition for electrolyte is injected into the pouch-like outer package member 40. Thereafter, the outer package member 40 is hermetically sealed with the use of a thermal fusion bonding method and/or the like. Subsequently, the monomer is thermally polymerized, and thereby, a polymer compound is formed. Accordingly, the polymer compound is impregnated with the electrolytic solution, the polymer compound gelates, and accordingly, the electrolyte layer 36 is formed.

In the third procedure, the spirally wound body is fabricated and contained in the pouch-like outer package member 40 in a manner similar to that of the foregoing second procedure, except that the separator 35 with both surfaces coated with a polymer compound is used. Examples of the polymer compound with which the separator 35 is coated may include a polymer (a homopolymer, a copolymer, or a multicomponent copolymer) containing vinylidene fluoride as a component. Specific examples of the homopolymer may include polyvinylidene fluoride. Specific examples of the copolymer may include a binary copolymer containing vinylidene fluoride and hexafluoro propylene as components. Specific examples of the multicomponent copolymer may include a ternary copolymer containing vinylidene fluoride, hexafluoro propylene, and chlorotrifluoroethylene as components. It is to be noted that, in addition to the polymer containing vinylidene fluoride as a component, other one or more polymer compounds may be used. Subsequently, an electrolytic solution is prepared and injected into the outer package member 40. Thereafter, the opening of the outer package member 40 is hermetically sealed with the use of a thermal fusion bonding method and/or the like. Subsequently, the resultant is heated while a weight is applied to the outer package member 40, and the separator 35 is adhered to the cathode 33 and the anode 34 with the polymer compound in between. Thereby, the polymer compound is impregnated with the electrolytic solution, and accordingly, the polymer compound is gelated to form the electrolyte layer 36.

In the third procedure, swollenness of the secondary battery is suppressed more than in the first procedure. Further, in the third procedure, the monomer as a raw material of the polymer compound, the solvent, and the like are less likely to be left in the electrolyte layer 36 compared to in the second procedure. Therefore, the formation step of the polymer compound is favorably controlled. Therefore, the cathode 33, the anode 34, and the separator 35 sufficiently adhere to the electrolyte layer 36.

[Function and Effect of Secondary Battery]

According to the laminated-film-type secondary battery, the electrolytic solution of the electrolyte layer 36 contains one or both of the disulfonyl compound and the disulfinyl compound. Therefore, for a reason similar to that of the cylindrical-type secondary battery described above, superior battery characteristics are obtainable.

In particular, since the laminated-film-type secondary battery in which the cathode 33, the anode 34, and the electrolytic solution are contained inside the film-like package member 40 is characterized in that the package member 40 is easily swollen due to gas generation, higher effects are obtainable. Other functions and other effects are similar to those of the cylindrical-type secondary battery.

[1-3. Lithium Metal Secondary Battery (Cylindrical Type and Laminated Film Type)]

A secondary battery described here is a lithium secondary battery (lithium metal secondary battery) in which the capacity of the anode 22 is represented by precipitation and dissolution of lithium metal. The secondary battery has a configuration similar to that of the foregoing lithium ion secondary battery (cylindrical-type lithium ion secondary battery), except that the anode active material layer 22B is configured of the lithium metal, and is manufactured by a procedure similar to that of the lithium ion secondary battery (cylindrical-type lithium ion secondary battery).

In the secondary battery, the lithium metal is used as an anode active material, and thereby, higher energy density is obtainable. The anode active material layer 22B may exist at the time of assembling, or the anode active material layer 22B does not necessarily exist at the time of assembling and may be configured of the lithium metal precipitated at the time of charge. Further, the anode active material layer 22B may be used as a current collector, and thereby, the anode current collector 22A may be omitted.

The secondary battery may operate, for example, as follows. At the time of charge, lithium ions are discharged from the cathode 21, and are precipitated as the lithium metal on the surface of the anode current collector 22A through the electrolytic solution. In contrast, at the time of discharge, the lithium metal is eluded as lithium ions from the anode active material layer 22B, and is inserted in the cathode 21 through the electrolytic solution.

According to the lithium metal secondary battery, the electrolytic solution contains one or both of the disulfonyl compound and the disulfinyl compound. Therefore, for a reason similar to that of the lithium ion secondary battery described above, superior battery characteristics are obtainable. Other functions and other effects are similar to those of the lithium ion secondary battery. It is to be noted that the foregoing lithium metal secondary battery is not limited to the cylindrical-type secondary battery, and may be a laminated-film-type secondary battery. In that case, a similar effect is obtainable as well.

[2. Applications of Non-Aqueous Secondary Battery]

Next, a description will be given of application examples of the foregoing secondary battery.

Applications of the secondary battery are not particularly limited as long as the secondary battery is applied to a machine, a device, an instrument, an apparatus, a system (collective entity of a plurality of devices and the like), or the like that is allowed to use the secondary battery as a driving electric power source, an electric power storage source for electric power storage, or the like. The secondary battery used as an electric power source may be a main electric power source (electric power source used preferentially), or may be an auxiliary electric power source (electric power source used instead of a main electric power source or used being switched from the main electric power source). In the case where the secondary battery is used as an auxiliary electric power source, the main electric power source type is not limited to the secondary battery.

Examples of applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a personal digital assistant. Further examples thereof may include a mobile lifestyle electric appliance such as an electric shaver; a memory device such as a backup electric power source and a memory card; an electric power tool such as an electric drill and an electric saw; a battery pack used for a notebook personal computer or the like as an attachable and detachable electric power source; a medical electronic apparatus such as a pacemaker and a hearing aid; an electric vehicle such as an electric automobile (including a hybrid automobile); and an electric power storage system such as a home battery system for storing electric power for emergency or the like. It goes without saying that an application other than the foregoing applications may be adopted.

In particular, the secondary battery is effectively applicable to the battery pack, the electric vehicle, the electric power storage system, the electric power tool, the electronic apparatus, or the like. One reason for this is that, in these applications, since superior battery characteristics are demanded, performance is effectively improved with the use of the secondary battery according to the embodiment of the present technology. It is to be noted that the battery pack is an electric power source using a secondary battery, and is a so-called assembled battery or the like. The electric vehicle is a vehicle that works (runs) with the use of a secondary battery as a driving electric power source. As described above, the electric vehicle may be an automobile (such as a hybrid automobile) including a drive source other than a secondary battery. The electric power storage system is a system using a secondary battery as an electric power storage source. For example, in a home electric power storage system, since electric power is stored in the secondary battery as an electric power storage source, the electric power is utilized, and thereby, home electric products and the like become usable. The electric power tool is a tool in which a movable section (such as a drill) is moved with the use of a secondary battery as a driving electric power source. The electronic apparatus is an apparatus executing various functions with the use of a secondary battery as a driving electric power source (electric power supply source).

A description will be specifically given of some application examples of the secondary battery. It is to be noted that the configurations of the respective application examples explained below are merely examples, and may be changed as appropriate.

[2-1. Battery Pack]

Figure 5:
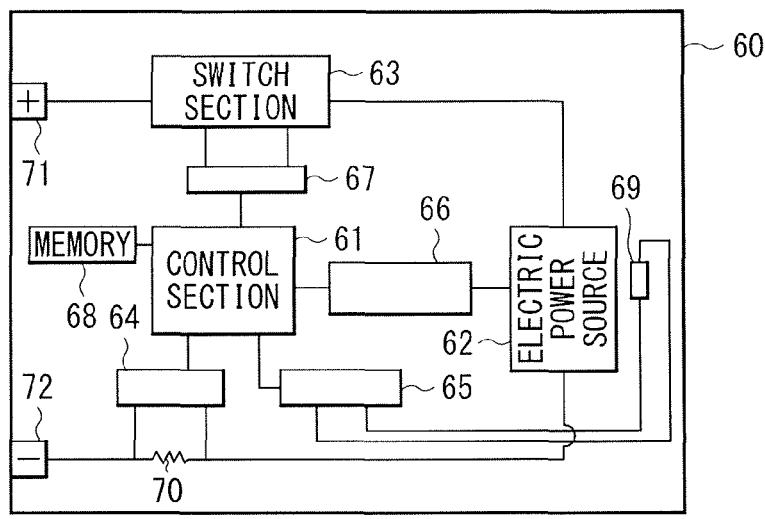
FIG. 5 is a block diagram illustrating a configuration of an application example (battery pack) of the non-aqueous secondary battery.

FIG. 5 illustrates a block configuration of a battery pack. For example, the battery pack may include a control section 61, an electric power source 62, a switch section 63, a current measurement section 64, a temperature detection section 65, a voltage detection section 66, a switch control section 67, a memory 68, a temperature detection device 69, a current detection resistance 70, a cathode terminal 71, and an anode terminal 72 in a housing 60 made of a plastic material and/or the like.

The control section 61 controls operation of the whole battery pack (including operation of the electric power source 62), and may include, for example, a central processing unit (CPU) and/or the like. The electric power source 62 includes one or more secondary batteries (not illustrated). The electric power source 62 may be, for example, an assembled battery including two or more secondary batteries. Connection type of these secondary batteries may be a series-connected type, may be a parallel-connected type, or a mixed type thereof. As an example, the electric power source 62 may include six secondary batteries connected in a manner of dual-parallel and three-series.

The switch section 63 switches the operation of the electric power source 62 (whether or not the electric power source 62 is connectable to an external device) according to an instruction of the control section 61. The switch section 63 may include, for example, a charge control switch, a discharge control switch, a charging diode, a discharging diode, and the like (not illustrated). The charge control switch and the discharge control switch may each be, for example, a semiconductor switch such as a field-effect transistor (MOSFET) using a metal oxide semiconductor.

The current measurement section 64 measures a current with the use of the current detection resistance 70, and outputs the measurement result to the control section 61. The temperature detection section 65 measures temperature with the use of the temperature detection device 69, and outputs the measurement result to the control section 61. The temperature measurement result may be used for, for example, a case in which the control section 61 controls charge and discharge at the time of abnormal heat generation or a case in which the control section 61 performs a correction processing at the time of calculating a remaining capacity. The voltage detection section 66 measures a voltage of the secondary battery in the electric power source 62, performs analog-to-digital conversion on the measured voltage, and supplies the resultant to the control section 61.

The switch control section 67 controls operations of the switch section 63 according to signals inputted from the current measurement section 64 and the voltage detection section 66.

The switch control section 67 executes control so that a charging current is prevented from flowing in a current path of the electric power source 62 by disconnecting the switch section 63 (charge control switch) in the case where, for example, a battery voltage reaches an overcharge detection voltage. Thereby, in the electric power source 62, only discharge is allowed to be performed through the discharging diode. It is to be noted that, for example, in the case where a large current flows at the time of charge, the switch control section 67 blocks the charging current.

Further, the switch control section 67 executes control so that a discharging current is prevented from flowing in the current path of the electric power source 62 by disconnecting the switch section 63 (discharge control switch) in the case where, for example, a battery voltage reaches an overdischarge detection voltage. Thereby, in the electric power source 62, only charge is allowed to be performed through the charging diode. It is to be noted that, for example, in the case where a large current flows at the time of discharge, the switch control section 67 blocks the discharging current.

It is to be noted that, in the secondary battery, for example, the overcharge detection voltage may be 4.20 V±0.05 V, and the over-discharge detection voltage may be 2.4 V±0.1 V.

The memory 68 may be, for example, an EEPROM as a non-volatile memory or the like. The memory 68 may store, for example, numerical values calculated by the control section 61 and information of the secondary battery measured in a manufacturing step (such as an internal resistance in the initial state). It is to be noted that, in the case where the memory 68 stores a full charge capacity of the secondary battery, the control section 61 is allowed to comprehend information such as a remaining capacity.

The temperature detection device 69 measures temperature of the electric power source 62, and outputs the measurement result to the control section 61. The temperature detection device 69 may be, for example, a thermistor or the like.

The cathode terminal 71 and the anode terminal 72 are terminals connected to an external device (such as a notebook personal computer) driven using the battery pack or an external device (such as a battery charger) used for charging the battery pack. The electric power source 62 is charged and discharged through the cathode terminal 71 and the anode terminal 72.

[2-2. Electric Vehicle]

Figure 6:
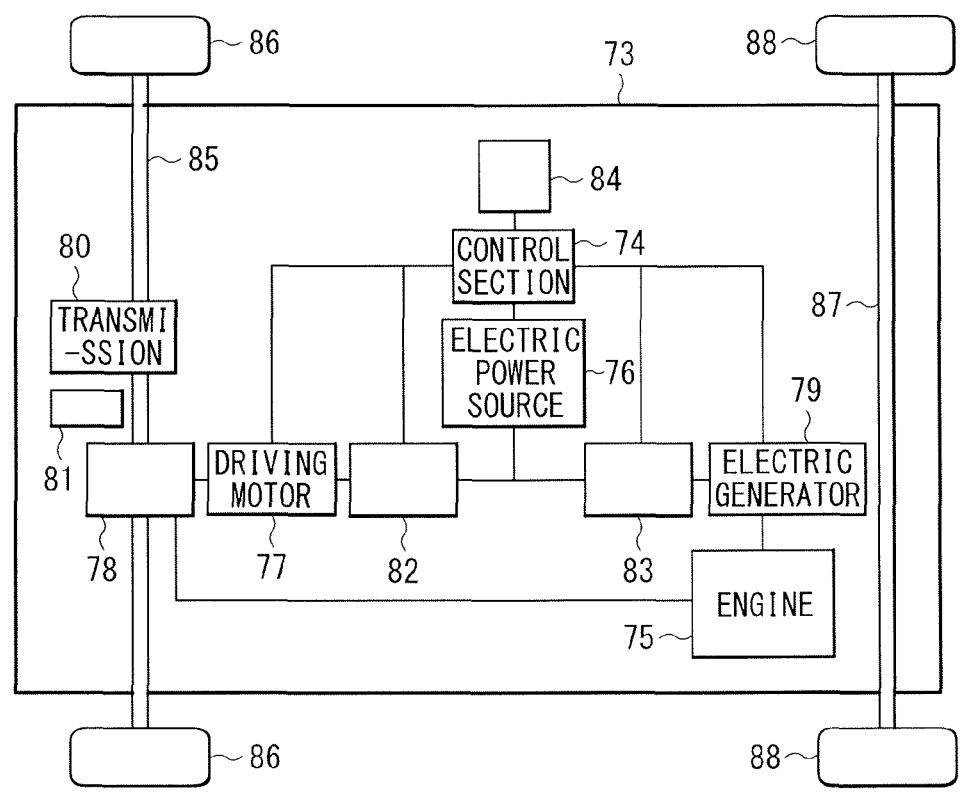
FIG. 6 is a block diagram illustrating a configuration of an application example (electric vehicle) of the non-aqueous secondary battery.

FIG. 6 illustrates a block configuration of a hybrid automobile as an example of electric vehicles. For example, the electric vehicle may include a control section 74, an engine 75, an electric power source 76, a driving motor 77, a differential 78, an electric generator 79, a transmission 80, a clutch 81, inverters 82 and 83, and various sensors 84 in a housing 73 made of metal. In addition thereto, the electric vehicle may include, for example, a front drive shaft 85 and a front tire 86 that are connected to the differential 78 and the transmission 80, a rear drive shaft 87, and a rear tire 88.

The electric vehicle may run with the use, for example, of one of the engine 75 and the motor 77 as a drive source. The engine 75 is a main power source, and may be, for example, a petrol engine. In the case where the engine 75 is used as a power source, drive power (torque) of the engine 75 may be transferred to the front tire 86 or the rear tire 88 through the differential 78, the transmission 80, and the clutch 81 as drive sections, for example. The torque of the engine 75 may also be transferred to the electric generator 79. Due to the torque, the electric generator 79 generates alternating-current electric power. The alternating-current electric power is converted into direct-current electric power through the inverter 83, and the converted power is stored in the electric power source 76. In contrast, in the case where the motor 77 as a conversion section is used as a power source, electric power (direct-current electric power) supplied from the electric power source 76 is converted into alternating-current electric power through the inverter 82. The motor 77 may be driven by the alternating-current electric power. Drive power (torque) obtained by converting the electric power by the motor 77 may be transferred to the front tire 86 or the rear tire 88 through the differential 78, the transmission 80, and the clutch 81 as the drive sections, for example.

It is to be noted that, alternatively, the following mechanism may be adopted. In the mechanism, when speed of the electric vehicle is reduced by an unillustrated brake mechanism, the resistance at the time of speed reduction is transferred to the motor 77 as torque, and the motor 77 generates alternating-current electric power by the torque. It may be preferable that the alternating-current electric power be converted to direct-current electric power through the inverter 82, and the direct-current regenerative electric power be stored in the electric power source 76.

The control section 74 controls operations of the whole electric vehicle, and, for example, may include a CPU and/or the like. The electric power source 76 includes one or more secondary batteries (not illustrated). Alternatively, the electric power source 76 may be connected to an external electric power source, and electric power may be stored by receiving the electric power from the external electric power source. The various sensors 84 may be used, for example, for controlling the number of revolutions of the engine 75 or for controlling opening level (throttle opening level) of an unillustrated throttle valve. The various sensors 84 may include, for example, a speed sensor, an acceleration sensor, an engine frequency sensor, and/or the like.

The description has been given above of the hybrid automobile as an electric vehicle. However, examples of the electric vehicles may include a vehicle (electric automobile) working with the use of only the electric power source 76 and the motor 77 without using the engine 75.

[2-3. Electric Power Storage System]

Figure 7:
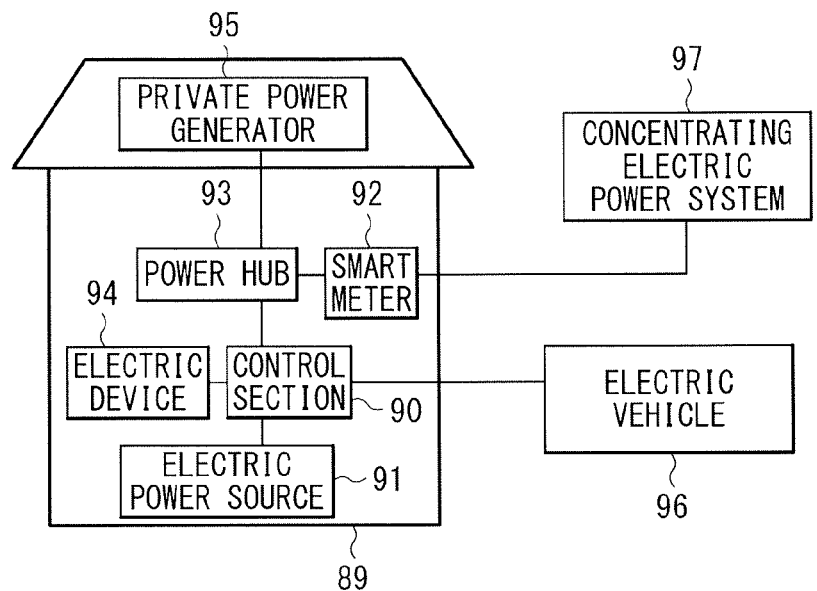
FIG. 7 is a block diagram illustrating a configuration of an application example (electric power storage system) of the non-aqueous secondary battery.

FIG. 7 illustrates a block configuration of an electric power storage system. For example, the electric power storage system may include a control section 90, an electric power source 91, a smart meter 92, and a power hub 93 inside a house 89 such as a general residence and a commercial building.

In this case, the electric power source 91 may be connected to, for example, an electric device 94 arranged inside the house 89, and may be connected to an electric vehicle 96 parked outside the house 89. Further, for example, the electric power source 91 may be connected to a private power generator 95 arranged inside the house 89 through the power hub 93, and may be connected to an external concentrating electric power system 97 thorough the smart meter 92 and the power hub 93.

It is to be noted that the electric device 94 may include, for example, one or more home electric appliances such as a refrigerator, an air conditioner, a television, and a water heater. The private power generator 95 may be, for example, one or more of a solar power generator, a wind-power generator, and the like. The electric vehicle 96 may be, for example, one or more of an electric automobile, an electric motorcycle, a hybrid automobile, and the like. The concentrating electric power system 97 may be, for example, one or more of a thermal power plant, an atomic power plant, a hydraulic power plant, a wind-power plant, and the like.

The control section 90 controls operation of the whole electric power storage system (including operation of the electric power source 91), and, for example, may include a CPU and/or the like. The electric power source 91 includes one or more secondary batteries (not illustrated). The smart meter 92 may be, for example, an electric power meter compatible with a network arranged in the house 89 demanding electric power, and may be communicable with an electric power supplier. Accordingly, for example, while the smart meter 92 communicates with outside, the smart meter 92 controls the balance between supply and demand in the house 89 and allows effective and stable energy supply.

In the electric power storage system, for example, electric power may be stored in the electric power source 91 from the concentrating electric power system 97 as an external electric power source through the smart meter 92 and the power hub 93, and electric power may be stored in the electric power source 91 from the private power generator 95 as an independent electric power source through the power hub 93. The electric power stored in the electric power source 91 is supplied to the electric device 94 or to the electric vehicle 96 according to an instruction of the control section 90. Therefore, the electric device 94 becomes operable, and the electric vehicle 96 becomes chargeable. That is, the electric power storage system is a system capable of storing and supplying electric power in the house 89 with the use of the electric power source 91.

The electric power stored in the electric power source 91 is arbitrarily usable. Therefore, for example, electric power is allowed to be stored in the electric power source 91 from the concentrating electric power system 97 in the middle of the night when an electric rate is inexpensive, and the electric power stored in the electric power source 91 is allowed to be used during daytime hours when an electric rate is expensive.

It is to be noted that the foregoing electric power storage system may be arranged for each household (family unit), or may be arranged for a plurality of households (family units).

[2-4. Electric Power Tool]

Figure 8:
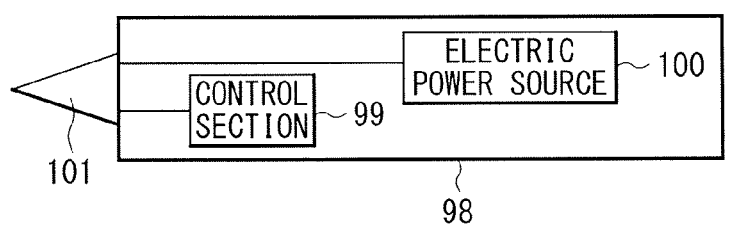
FIG. 8 is a block diagram illustrating a configuration of an application example (electric power tool) of the non-aqueous secondary battery.

FIG. 8 illustrates a block configuration of an electric power tool. For example, the electric power tool may be an electric drill, and may include a control section 99 and an electric power source 100 in a tool body 98 made of a plastic material and/or the like. For example, a drill section 101 as a movable section may be attached to the tool body 98 in an operable (rotatable) manner.

The control section 99 controls operations of the whole electric power tool (including operation of the electric power source 100), and may include, for example, a CPU and/or the like. The electric power source 100 includes one or more secondary batteries (not illustrated). The control section 99 allows electric power to be supplied from the electric power source 100 to the drill section 101 according to operation of an unillustrated operation switch to operate the drill section 101.

EXAMPLES

Specific Examples according to the embodiment of the present technology will be described in detail.

Examples 1-1 to 1-21 and 2-1 to 2-21

The laminated-film-type lithium ion secondary battery illustrated in FIG. 3 and FIG. 4 was fabricated by the following procedure.

Upon fabricating the cathode 33, first, 90 parts by mass of a cathode active material ($LiCoO_2$), 5 parts by mass of a cathode binder (polyvinylidene fluoride), and 5 parts by mass of a cathode electric conductor (graphite) were mixed to obtain a cathode mixture. Subsequently, the cathode mixture was dispersed in an organic solvent (N-methyl-2-pyrrolidone) to obtain paste cathode mixture slurry. Subsequently, both surfaces of the cathode current collector 33A (aluminum foil being 20 µm thick) were coated with the cathode mixture slurry uniformly with the use of a coating device, and the applied cathode mixture slurry was dried to form the cathode active material layer 33B. Finally, the cathode active material layer 33B was compression-molded with the use of a roll pressing machine, and subsequently, the cathode current collector 33A on which the cathode active material layer 33B was formed was cut in the shape of a strip (50 mm×350 mm).

Upon fabricating the anode 34, first, 95 parts by mass of an anode active material (artificial graphite) and 5 parts by mass of an anode binder (polyvinylidene fluoride) were mixed to obtain an anode mixture. As the artificial graphite, spherical graphite having an average grain diameter (media diameter) of 30 µm was used. Subsequently, the anode mixture was dispersed in an organic solvent (N-methyl-2-pyrrolidone) to obtain paste anode mixture slurry. Subsequently, both surfaces of the anode current collector 34A (electrolytic copper foil being 15 µm thick) were coated with the anode mixture slurry uniformly with the use of a coating device, and the applied anode mixture slurry was dried to form the anode active material layer 34B. Finally, the anode active material layer 34B was compression-molded with the use of a roll pressing machine, and subsequently, the anode current collector 34A on which the anode active material layer 34B was formed was cut in the shape of a strip (52 mm×370 mm).

It is to be noted that upon fabricating the cathode 33 and the anode 34, the capacity ratio between the cathode 33 and the anode 34 was designed so that the capacity of the anode 34 was represented by a capacity component due to insertion and extraction of lithium ions.

Upon preparing a precursor solution for forming the electrolyte layer 36, a disulfonyl compound and an electrolyte salt were dispersed in a non-aqueous solvent to obtain an electrolytic solution, and subsequently, the electrolytic solution was mixed with a polymer compound (polyvinylidene fluoride). Thereby, the electrolytic solution was supported by the polymer compound in the precursor solution.

As the non-aqueous solvent, vinylene carbonate (VC) and 4-fluoro-1,3-dioxolane-2-one (FEC) were used together with ethylene carbonate (EC), propylene carbonate (PC), and diethyl carbonate (DEC). In the case of using EC and PC, EC and PC were mixed at a volume ratio of 1:1. In the case of using VC or FEC together with EC and PC, EC and PC were mixed at a volume ratio of 1:1, and subsequently, VC or FEC was added thereto so that the content in the non-aqueous solvent became 1 mass %. In the case of using EC, PC, and DEC, EC, PC, and DEC were mixed at a volume ratio of 1:1:1. In the case of using VC or FEC together with EC, PC, and DEC, EC, PC, and DEC were mixed at a volume ratio of 1:1:1, and subsequently, VC or FEC was added thereto so that the content in the non-aqueous solvent became 1 mass %.

As the electrolyte salt, lithium hexafluorophosphate (LiPF6) and lithium bis(trifluoromethanesulfonyl)imide ($LiN(SO_2F)_2$: LiFSI) were used. In the case of using only $LiPF_6$, the content of $LiPF_6$ with respect to the non-aqueous solvent was 1 $mol/dm^3$(=mol/l ). In the case of using LiFSI together with $LiPF_6$, the content of $LiPF_6$ was 0.9 $mol/dm^3$, and the content of LiFSI was 0.1 $mol/dm^3$.

Types of disulfonyl compounds and contents (mass %) thereof in electrolytic solutions were as illustrated in Table 1 and Table 2. It is to be noted that, for comparison, electrolytic solutions not containing any of the disulfonyl compounds and electrolytic solutions each containing one of other disulfonyl compounds were also used.

Upon assembling the secondary battery, first, the cathode lead 31 made of aluminum was welded to the cathode current collector 33A, and the anode lead 32 made of nickel was welded to the anode current collector 34A. Subsequently, the cathode 33 and the anode 34 were coated with the precursor solution to form the electrolyte layer 36 as a gel electrolyte. Subsequently, the cathode 33 and the anode 34 were layered with the separator 35 (microporous polypropylene film being 25 μm thick) in between and were spirally wound in the longitudinal direction to fabricate the spirally wound electrode body 30. Thereafter, the protective tape 37 was bonded to the outermost circumference portion thereof. Finally, the spirally wound electrode body 30 was sandwiched between two pieces of film-like outer package members 40, and subsequently, the outer edges of the outer package members 40 were thermally bonded under reduced-pressure environment. Thereby, the spirally wound electrode body 30 was enclosed into the outer package members 40. The outer package member 40 was a moisture-resistant aluminum laminated film in which a nylon film being 25 μm thick, an aluminum foil being 40 μm thick, and a polypropylene film being 30 μm thick were laminated from outside. Thereby, the secondary battery was completed.

Various characteristics (swollenness characteristics and cycle characteristics) of the secondary battery were examined. Results illustrated in Table 1 and Table 2 were obtained.

Upon examining the swollenness characteristics, two cycles of charge and discharge was performed on the secondary battery in the ambient temperature environment (23 deg C.). Thereafter, the secondary battery was soaked into an ethanol bath, and the cubic volume ($cm^3$) before conservation was measured. Subsequently, the secondary battery was taken out from the ethanol bath, and was sufficiently dried. Thereafter, the secondary battery was charged again, and was conserved (for 30 days) in such a state in a constant-temperature bath (at 60 deg C.), and subsequently, the secondary battery was soaked into the ethanol bath again to measure the cubic volume ($cm^3$) after conservation. From the measurement results, swollenness ratio (%)=(cubic volume after conservation/cubic volume before conservation)× 100 was calculated. At the time of charge, charge was performed at a constant current of 1680 mA until the upper limit voltage reached 4.2 V, and thereafter, charge was performed at a constant voltage of 4.2 V until the total charge time reached 4 hours. At the time of discharge, discharge was performed at a constant current of 1200 mA until the battery voltage reached 2.5 V.

Upon examining the cycle characteristics, one cycle of charge and discharge was performed on the secondary battery in the ambient temperature environment (23 deg C.) to measure the discharge capacity. Subsequently, the secondary battery was charged and discharged in the same environment until the total number of cycles reached 300 cycles to measure the discharge capacity. From the result, capacity retention ratio (%)=(discharge capacity at the 300th cycle/discharge capacity at the first cycle)×100 was calculated. Charge and discharge conditions were similar to those in the case of examining the swollenness characteristics.

TABLE 1

Cathode active material: $LiCoO_2$
Anode active material: artificial graphite

| Example | Electrolyte salt | Non-aqueous solvent | Disulfonyl compound Type | Content (mass %) | Swollenness ratio (%) | Capacity retention ratio (%) |
|---|---|---|---|---|---|---|
| 1-1 | $LiPF_6$ | EC + PC + VC | Formula (1-1) | 0.0005 | 129 | 70 |
| 1-2 | | | | 0.001 | 120 | 75 |
| 1-3 | | | | 0.02 | 104 | 84 |
| 1-4 | | | | 0.5 | 105 | 81 |
| 1-5 | | | | 1 | 107 | 79 |
| 1-6 | | | | 2 | 109 | 79 |
| 1-7 | | | | 5 | 112 | 81 |
| 1-8 | | | | 8 | 133 | 69 |
| 1-9 | | | Formula (1-2) | 0.02 | 110 | 78 |
| 1-10 | | | Formula (1-3) | | 112 | 77 |

TABLE 1-continued

Cathode active material: LiCoO₂
Anode active material: artificial graphite

| Example | Electrolyte salt | Non-aqueous solvent | Disulfonyl compound Type | Content (mass %) | Swollenness ratio (%) | Capacity retention ratio (%) |
|---|---|---|---|---|---|---|
| 1-11 |  |  | Formula (1-10) |  | 119 | 74 |
| 1-12 |  |  | Formula (1-11) |  | 120 | 73 |
| 1-13 |  |  | Formula (1-14) |  | 119 | 76 |
| 1-14 |  | EC + PC + FEC | Formula (1-1) |  | 108 | 85 |
| 1-15 |  | EC + PC |  |  | 105 | 80 |
| 1-16 | LiPF₆ + LiFSI | EC + PC + VC |  |  | 102 | 86 |
| 1-17 | LiPF₆ | EC + PC + VC | — | — | 141 | 61 |
| 1-18 |  |  | Formula (14-1) | 0.02 | 131 | 70 |
| 1-19 |  |  | Formula (14-2) |  | 139 | 78 |
| 1-20 |  | EC + PC | — | — | 149 | 60 |
| 1-21 | LiPF₆ + LiFSI | EC + PC + VC |  |  | 140 | 63 |

TABLE 2

Cathode active material: LiCoO₂
Anode active material: artificial graphite

| Example | Electrolyte salt | Non-aqueous solvent | Disulfonyl compound Type | Content (mass %) | Swollenness ratio (%) | Capacity retention ratio (%) |
|---|---|---|---|---|---|---|
| 2-1 | LiPF₆ | EC + PC + DEC + VC | Formula (1-1) | 0.0005 | 135 | 63 |
| 2-2 |  |  |  | 0.001 | 113 | 79 |
| 2-3 |  |  |  | 0.02 | 108 | 86 |
| 2-4 |  |  |  | 0.5 | 111 | 83 |
| 2-5 |  |  |  | 1 | 114 | 82 |
| 2-6 |  |  |  | 2 | 113 | 82 |
| 2-7 |  |  |  | 5 | 110 | 80 |
| 2-8 |  |  |  | 8 | 139 | 60 |
| 2-9 |  |  | Formula (1-2) | 0.02 | 116 | 82 |
| 2-10 |  |  | Formula (1-3) |  | 118 | 80 |
| 2-11 |  |  | Formula (1-10) |  | 119 | 70 |
| 2-12 |  |  | Formula (1-11) |  | 123 | 67 |
| 2-13 |  |  | Formula (1-14) |  | 120 | 71 |
| 2-14 |  | EC + PC + DEC + FEC | Formula (1-1) |  | 110 | 85 |
| 2-15 |  | EC + PC + DEC |  |  | 107 | 80 |
| 2-16 | LiPF₆ + LiFSI | EC + PC + DEC + VC |  |  | 104 | 88 |
| 2-17 | LiPF₆ | EC + PC + DEC + VC | — | — | 144 | 60 |
| 2-18 |  |  | Formula (14-1) | 0.02 | 135 | 62 |
| 2-19 |  |  | Formula (14-2) |  | 138 | 79 |
| 2-20 |  | EC + PC + DEC | — | — | 148 | 62 |
| 2-21 | LiPF₆ + LiFSI | EC + PC + DEC + VC |  |  | 142 | 64 |

In the case where an electrolytic solution contained any of the disulfonyl compounds, the swollenness ratio was largely decreased and the capacity retention ratio was largely increased, compared to in a case where an electrolytic solution did not contain any of the disulfonyl compounds and a case in which an electrolytic solution contained any of other disulfonyl compounds.

In particular, in the case where an electrolytic solution contained any of the disulfonyl compounds, when the disulfonyl compound contained a fluorine group as a halogen group (X1), the swollenness ratio was further decreased and the capacity retention ratio was further increased. Further, in the case where a content of any of the disulfonyl compounds was in the range from 0.0005 mass % to 8 mass % both inclusive, a low swollenness ratio and a high capacity retention ratio were obtained. In the case where such a content was in the range from 0.001 mass % to 5 mass % both inclusive, the swollenness ratio was further decreased and the capacity retention ratio was further increased.

In addition thereto, in the case where a non-aqueous solvent contained the first unsaturated cyclic ester carbonate (VC) or the halogenated cyclic ester carbonate (FEC), the capacity retention ratio was further increased. Further, in the case where an electrolyte salt contained LiFSI, the swollenness ratio was further decreased, and the capacity retention ratio was further increased.

Examples 3-1 to 3-10

Secondary batteries were fabricated by a procedure similar to those of Examples 1-1 to 1-21 and 2-1 to 2-21, except that lithium-iron-phosphate compound (LiFePO$_4$) was used as a cathode active material and lithium bis(trifluoromethanesulfonyl)imide (LiN(CF$_3$SO$_2$)$_2$: LiTFSI) was used as an electrolyte salt, and various characteristics were examined. When only one of LiFSI and LiTFSI was used as an electrolyte salt, the content with respect to the non-aqueous solvent was 1 mol/dm$^3$.

ite) were mixed to obtain an anode mixture. The average grain diameter (median diameter) of silicon was 1 μm.

In the case where an SnCoC-containing material (SnCoC) was used as a metal-based material, cobalt powder and tin powder were alloyed to obtain cobalt tin alloy powder. Thereafter, carbon powder was added thereto, and the resultant was dry-mixed. Subsequently, 10 g of the foregoing mixture and about 400 g of a corundum being 9 mm in diameter were set in a reaction container of a planetary ball mill available from Ito Seisakusho Co. Subsequently, inside of the reaction container was substituted by argon atmosphere. Thereafter, 10 minute operation at 250 rpm and 10 minute break were repeated until the total operation time reached 20 hours. Subsequently, the reaction container was cooled down to room temperature and SnCoC as a reactant was taken out. Thereafter, the resultant was screened through a 280 mesh sieve to remove coarse grain.

The composition of obtained SnCoC was analyzed. The Sn content was 49.5 mass %, the Co content was 29.7 mass %, the C content was 19.8 mass %, and the ratio (Co/(Sn+

TABLE 3

Cathode active material: LiFePO$_4$
Anode active material: artificial graphite

| Example | Electrolyte salt | Non-aqueous solvent | Disulfonyl compound Type | Disulfonyl compound Content (mass %) | Swollenness ratio (%) | Capacity retention ratio (%) |
|---|---|---|---|---|---|---|
| 3-1 | LiPF$_6$ | EC + PC + VC | Formula (1-1) | 0.02 | 112 | 80 |
| 3-2 | LiPF$_6$ + LiFSI | | | | 106 | 86 |
| 3-3 | LiFSI | | | | 108 | 84 |
| 3-4 | LiPF$_6$ + LiTFSI | | | | 114 | 77 |
| 3-5 | LiTFSI | | | | 117 | 76 |
| 3-6 | LiPF$_6$ | EC + PC + VC | — | — | 129 | 74 |
| 3-7 | LiPF$_6$ + LiFSI | | | | 136 | 67 |
| 3-8 | LiFSI | | | | 138 | 70 |
| 3-9 | LiPF$_6$ + LiTFSI | | | | 139 | 69 |
| 3-10 | LiTFSI | | | | 140 | 68 |

Even if the type of the cathode active material was changed, when an electrolytic solution contained the disulfonyl compound, a low swollenness ratio and a high capacity retention ratio were obtained. Further, when an electrolyte salt contained LiFSI, the swollenness ratio was further decreased, and the capacity retention ratio was further increased.

Examples 4-1, 4-2, 5-1, and 5-2

Secondary batteries were fabricated by a procedure similar to those of Examples 1-1 to 1-24 and 2-1 to 2-24, except that metal-based materials were used as anode active materials as illustrated in Table 4 and Table 5, and various characteristics were examined.

Figure 9:
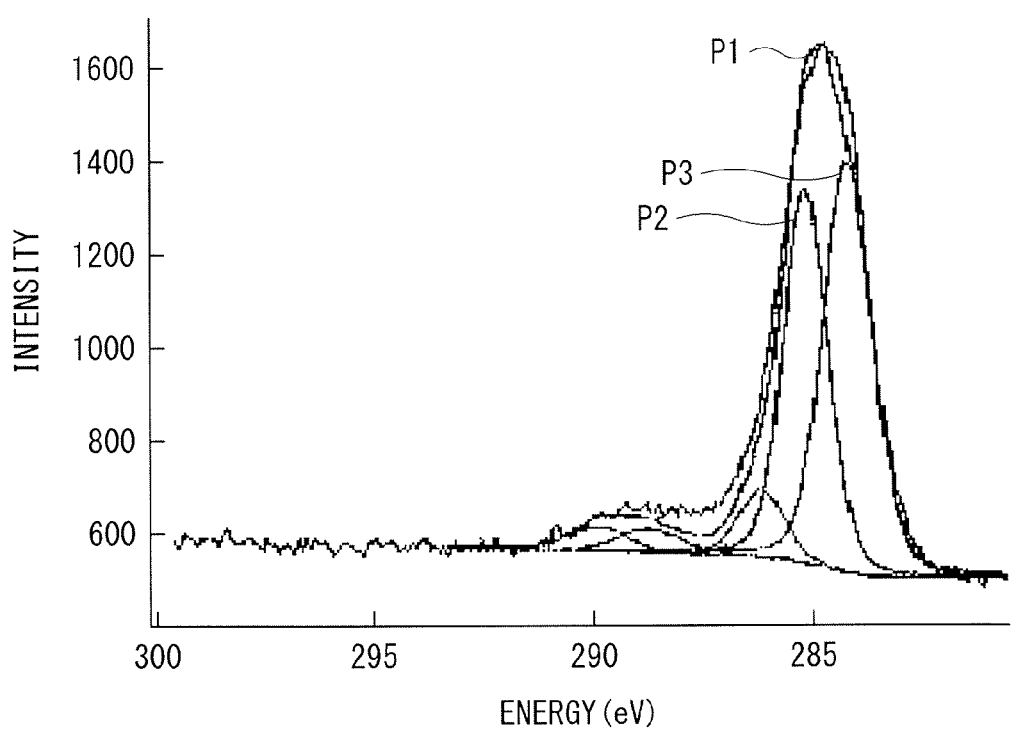
FIG. 9 is a diagram illustrating an analytical result of SnCoC by XPS.

In the case where silicon (Si) was used as a metal-based material, 80 parts by mass of the anode active material (Si), 8 parts by mass of an anode binder (polyvinylidene fluoride), and 12 parts by mass of an anode electric conductor (graph- Co)) of Sn and Co was 37.5 mass %. At this time, inductively coupled plasma (ICP) emission analysis was used to measure the Sn content and the Co content, and a carbon sulfur analysis device was used to measure the C content. Further, SnCoC was analyzed with the use of an X-ray diffraction method. A diffraction peak having half bandwidth in the range of 2θ=20 deg to 50 deg both inclusive was observed. Further, after SnCoC was analyzed with the use of XPS, as illustrated in FIG. 9, a peak P1 was obtained. After the peak P1 was analyzed, a peak P2 of the surface contamination carbon and a peak P3 of C1s in SnCoC existing on the lower energy side (region lower than 284.5 eV) were obtained. From the result, it was confirmed that C in SnCoC was bonded to other element.

After SnCoC was obtained, 80 parts by mass of the anode active material (SnCoC), 8 parts by mass of an anode binder (polyvinylidene fluoride), and 12 parts by mass of an anode electrical conductor (graphite) were mixed to obtain an anode mixture.

TABLE 4

Cathode active material: $LiCoO_2$
Anode active material: Si

| Example | Electrolyte salt | Non-aqueous solvent | Disulfonyl compound Type | Content (mass %) | Swollenness ratio (%) | Capacity retention ratio (%) |
|---|---|---|---|---|---|---|
| 4-1 | $LiPF_6$ | EC + PC + VC | Formula (1-1) | 0.02 | 112 | 76 |
| 4-2 | $LiPF_6$ | EC + PC + VC | — | — | 130 | 68 |

TABLE 5

Cathode active material: $LiCoO_2$
Anode active material: SnCoC

| Example | Electrolyte salt | Non-aqueous solvent | Disulfonyl compound Type | Content (mass %) | Swollenness ratio (%) | Capacity retention ratio (%) |
|---|---|---|---|---|---|---|
| 5-1 | $LiPF_6$ | EC + PC + VC | Formula (1-1) | 0.02 | 120 | 73 |
| 5-2 | $LiPF_6$ | EC + PC + VC | — | — | 124 | 69 | ks

Even if the type of the anode active material was changed, when an electrolytic solution contained the disulfonyl compound, a low swollenness ratio and a high capacity retention ratio were obtained.

Examples 6-1 to 6-21, 7-1 to 7-21, 8-1 to 8-10, 9-1, 9-2, 10-1, and 10-2

Secondary batteries were fabricated by a procedure similar to those of Examples 1-1 to 1-21, 2-1 to 2-21, 3-1 to 3-10, 4-1, 4-2, 5-1, and 5-2, except that disulfinyl compounds were used instead of the disulfonyl compounds, and various characteristics were examined.

TABLE 6

Cathode active material: $LiCoO_2$
Anode active material: artificial graphite

| Example | Electrolyte salt | Non-aqueous solvent | Disulfonyl compound Type | Content (mass %) | Swollenness ratio (%) | Capacity retention ratio (%) |
|---|---|---|---|---|---|---|
| 6-1 | $LiPF_6$ | EC + PC + VC | Formula (2-1) | 0.0005 | 128 | 68 |
| 6-2 | | | | 0.001 | 121 | 67 |
| 6-3 | | | | 0.02 | 106 | 80 |
| 6-4 | | | | 0.5 | 108 | 78 |
| 6-5 | | | | 1 | 110 | 76 |
| 6-6 | | | | 2 | 111 | 77 |
| 6-7 | | | | 5 | 113 | 76 |
| 6-8 | | | | 8 | 120 | 69 |
| 6-9 | | | Formula (2-2) | 0.02 | 111 | 76 |
| 6-10 | | | Formula (2-3) | | 114 | 75 |
| 6-11 | | | Formula (2-10) | | 119 | 72 |
| 6-12 | | | Formula (2-11) | | 120 | 70 |
| 6-13 | | | Formula (2-14) | | 120 | 68 |
| 6-14 | | EC + PC + FEC | Formula (2-1) | | 108 | 80 |
| 6-15 | | EC + PC | | | 109 | 79 |

TABLE 6-continued

Cathode active material: LiCoO$_2$
Anode active material: artificial graphite

| Example | Electrolyte salt | Non-aqueous solvent | Disulfonyl compound Type | Content (mass %) | Swollenness ratio (%) | Capacity retention ratio (%) |
|---|---|---|---|---|---|---|
| 6-16 | LiPF$_6$ + LiFSI | EC + PC + VC | | | 103 | 84 |
| 6-17 | LiPF$_6$ | EC + PC + VC | — | — | 141 | 61 |
| 6-18 | | | Formula (14-3) | 0.02 | 138 | 66 |
| 6-19 | | | Formula (14-4) | | 136 | 65 |
| 6-20 | | EC + PC | — | — | 149 | 60 |
| 6-21 | LiPF$_6$ + LiFSI | EC + PC + VC | | | 140 | 63 |

TABLE 7

Cathode active material: LiCoO$_2$
Anode active material: artificial graphite

| Example | Electrolyte salt | Non-aqueous solvent | Disulfonyl compound Type | Content (mass %) | Swollenness ratio (%) | Capacity retention ratio (%) |
|---|---|---|---|---|---|---|
| 7-1 | LiPF$_6$ | EC + PC + DEC + VC | Formula (2-1) | 0.0005 | 138 | 62 |
| 7-2 | | | | 0.001 | 114 | 77 |
| 7-3 | | | | 0.02 | 110 | 85 |
| 7-4 | | | | 0.5 | 112 | 82 |
| 7-5 | | | | 1 | 117 | 80 |
| 7-6 | | | | 2 | 119 | 78 |
| 7-7 | | | | 5 | 118 | 78 |
| 7-8 | | | | 8 | 138 | 60 |
| 7-9 | | | Formula (2-2) | 0.02 | 118 | 79 |
| 7-10 | | | Formula (2-3) | | 121 | 77 |
| 7-11 | | | Formula (2-10) | | 121 | 68 |
| 7-12 | | | Formula (2-11) | | 124 | 66 |
| 7-13 | | | Formula (2-14) | | 126 | 66 |
| 7-14 | | EC + PC + DEC + FEC | Formula (2-1) | | 118 | 84 |
| 7-15 | | EC + PC + DEC | | | 109 | 82 |
| 7-16 | LiPF$_6$ + LiFSI | EC + PC + DEC + VC | | | 106 | 86 |
| 7-17 | LiPF$_6$ | EC + PC + DEC + VC | — | — | 144 | 60 |
| 7-18 | | | Formula (14-3) | 0.02 | 138 | 63 |
| 7-19 | | | Formula (14-4) | | 140 | 66 |
| 7-20 | | EC + PC + DEC | — | — | 148 | 62 |
| 7-21 | LiPF$_6$ + LiFSI | EC + PC + DEC + VC | | | 142 | 64 |

TABLE 8

Cathode active material: LiFePO$_4$
Anode active material: artificial graphite

| Example | Electrolyte salt | Non-aqueous solvent | Disulfonyl compound Type | Content (mass %) | Swollenness ratio (%) | Capacity retention ratio (%) |
|---|---|---|---|---|---|---|
| 8-1 | LiPF$_6$ | EC + PC + VC | Formula (2-1) | 0.02 | 113 | 78 |
| 8-2 | LiPF$_6$ + LiFSI | | | | 106 | 82 |
| 8-3 | LiFSI | | | | 108 | 80 |
| 8-4 | LiPF$_6$ + LiTFSI | | | | 117 | 78 |
| 8-5 | LiTFSI | | | | 119 | 77 |
| 8-6 | LiPF$_6$ | EC + PC + VC | — | — | 130 | 71 |
| 8-7 | LiPF$_6$ + LiFSI | | | | 135 | 66 |
| 8-8 | LiFSI | | | | 136 | 71 |
| 8-9 | LiPF$_6$ + LiTFSI | | | | 141 | 67 |
| 8-10 | LiTFSI | | | | 142 | 65 |

TABLE 9

Cathode active material: LiCoO$_2$
Anode active material: Si

| Example | Electrolyte salt | Non-aqueous solvent | Disulfonyl compound Type | Content (mass %) | Swollenness ratio (%) | Capacity retention ratio (%) |
|---|---|---|---|---|---|---|
| 9-1 | LiPF$_6$ | EC + PC + VC | Formula (2-1) | 0.02 | 120 | 75 |
| 9-2 | LiPF$_6$ | EC + PC + VC | — | — | 129 | 70 |

TABLE 10

Cathode active material: LiCoO$_2$
Anode active material: SnCoC

| Example | Electrolyte salt | Non-aqueous solvent | Disulfonyl compound Type | Content (mass %) | Swollenness ratio (%) | Capacity retention ratio (%) |
|---|---|---|---|---|---|---|
| 10-1 | LiPF$_6$ | EC + PC + VC | Formula (2-1) | 0.02 | 112 | 78 |
| 10-2 | LiPF$_6$ | EC + PC + VC | — | — | 132 | 72 |

Even if the disulfinyl compounds were used, results similar to those of the cases in which the disulfonyl compounds were used (Table 1 to Table 5) were obtained. That is, in the case where an electrolytic solution contained any of the disulfinyl compounds, the swollenness ratio was largely decreased and the capacity retention ratio was largely increased, compared to in a case in which an electrolytic solution did not contain any of the disulfinyl compounds and a case in which an electrolytic solution contained any of the other disulfinyl compounds. Since the other tendencies were similar to those of the cases in which the disulfonyl compounds were used, descriptions thereof will be omitted.

From the results of Table 1 to Table 10, in the case where electrolytic solutions each contained one or both of any of the disulfonyl compounds and any of the disulfinyl compounds, superior battery characteristics were obtained.

The present technology has been described with reference to the embodiment and Examples. However, the present technology is not limited to the examples described in the embodiment and Examples, and various modifications may be made. For example, the description has been given with the specific examples of the case in which the battery structure is the cylindrical type or the laminated film type, and the battery device has the spirally wound structure. However, applicable structures are not limited thereto. The non-aqueous secondary battery of the present technology is similarly applicable to a battery having other battery structure such as a square-type battery, a coin-type battery, and a button-type battery or a battery in which the battery device has other structure such as a laminated structure.

Further, the description has been given of the case in which lithium (Li) is used as an electrode reactant. However, the electrode reactant is not necessarily limited thereto. As an electrode reactant, for example, other Group 1 element such as sodium (Na) and potassium (K), a Group 2 element such as magnesium (Mg) and calcium (Ca), or other light metal such as Al may be used. The effect of the present technology may be obtained without depending on the electrode reactant type, and therefore, even if the electrode reactant type is changed, a similar effect is obtainable.

Further, with regard to the contents of the disulfonyl compound and the disulfinyl compound, the description has been given of the appropriate range derived from the results of Examples. However, the description does not totally deny a possibility that the contents are out of the foregoing range. That is, the foregoing appropriate range is a range particularly preferable for obtaining the effects of the present technology. Therefore, as long as the effects of the present technology are obtained, the content may be out of the foregoing range in some degrees.

It is possible to achieve at least the following configurations from the above-described example embodiment and the modifications of the disclosure.

(1) A non-aqueous secondary battery including:
    a cathode;
    an anode; and
    an electrolytic solution, wherein
    the electrolytic solution includes
    a non-aqueous solvent,
    an electrolyte salt, and
    one or both of a disulfonyl compound represented by a following Formula (1) and a disulfinyl compound represented by a following Formula (2),

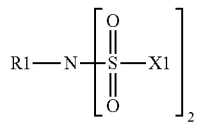
(1)

where R1 is one of a hydrocarbon group, a halogenated hydrocarbon group, an oxygen-containing hydrocarbon group, a halogenated oxygen-containing hydrocarbon group, and a group obtained by bonding two or more thereof to one another; and X1 is a halogen group,

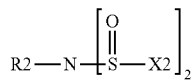
(2)

where R2 is one of a hydrocarbon group, a halogenated hydrocarbon group, an oxygen-containing hydrocarbon group, a halogenated oxygen-containing hydrocarbon group, and a group obtained by bonding two or more thereof to one another; and X2 is a halogen group.

(2) The non-aqueous secondary battery according to (1), wherein
    the hydrocarbon group is one of an alkyl group, an alkenyl group, an alkynyl group, an aryl group, and a cycloalkyl group,
    the oxygen-containing hydrocarbon group is one of an alkoxy group, a first ester group (—C(=O)—O—R3: R3 is an alkyl group), an ester carbonate group (—O—C(=O)—O—R4: R4 is an alkyl group), a second ester group (—O—C(=O)—R5: R5 is an alkyl group), and a polyether group (—(R6O)$_n$-R7: R6 is an alkylene group, R7 is an alkyl group, and n is an integer number equal to or more than 2),
    the halogenated hydrocarbon group and the halogenated oxygen-containing hydrocarbon group each include one or more of elements selected from a group including fluorine (F), chlorine (Cl), bromine (Br), and iodine (I), and
    the halogen group is one of a fluorine group (—F), a chlorine group (—Cl), a bromine group (—Br), and an iodine group (—I).

(3) The non-aqueous secondary battery according to (2), wherein
    each of carbon numbers of the alkyl group and the alkoxy group is from 1 to 18 both inclusive,
    each of carbon numbers of the alkenyl group and the alkynyl group is from 2 to 18 both inclusive,
    a carbon number of the aryl group is from 6 to 18 both inclusive, and
    a carbon number of the cycloalkyl group is from 3 to 18 both inclusive.

(4) The non-aqueous secondary battery according to any one of (1) to (3), wherein each of the X1 and the X2 is a fluorine group (5) The non-aqueous secondary battery according to any one of (1) to (4), wherein
    the disulfonyl compound includes one or more of compounds selected from a group including Formula (1-1) to Formula (1-19), and
    the disulfinyl compound includes one or more of compounds selected from a group including Formula (2-1) to Formula (2-19),

| | |
|---|---|
| CH$_3$—N—(SO$_2$F)$_2$ | (1-1) |
| C$_2$H$_5$—N—(SO$_2$F)$_2$ | (1-2) |
| C$_3$H$_7$—N—(SO$_2$F)$_2$ | (1-3) |
| CH$_2$=CH—N—(SO$_2$F)$_2$ | (1-4) |
| CH≡C—N—(SO$_2$F)$_2$ | (1-5) |
| C$_6$H$_5$—N—(SO$_2$F)$_2$ | (1-6) |
| C$_6$H$_{11}$—N—(SO$_2$F)$_2$ | (1-7) |
| CH$_3$—C(=O)O—C$_2$H$_4$—N—(SO$_2$F)$_2$ | (1-8) |
| CH$_3$OC(=O)—C$_2$H$_4$—N—(SO$_2$F)$_2$ | (1-9) |
| CH$_3$OC(=O)O—C$_2$H$_4$—N—(SO$_2$F)$_2$ | (1-10) |
| CH$_3$OC(=O)O—C$_3$H$_6$—N—(SO$_2$F)$_2$ | (1-11) |
| CF$_3$—N—(SO$_2$F)$_2$ | (1-12) |
| C$_6$H$_5$—CH$_2$—N—(SO$_2$F)$_2$ | (1-13) |
| CH$_3$—N—(SO$_2$Cl)$_2$ | (1-14) |
| CH$_3$—N—(SO$_2$Br)$_2$ | (1-15) |
| CH$_3$—N—(SO$_2$I)$_2$ | (1-16) |
| CH$_3$O—C$_2$H$_4$—N—(SO$_2$F)$_2$ | (1-17) |
| CH$_3$—(OC$_2$H$_4$)$_2$—N—(SO$_2$F)$_2$ | (1-18) |
| CH$_3$OC(=O)—N—(SO$_2$F)$_2$ | (1-19) |
| CH$_3$—N—(SOF)$_2$ | (2-1) |
| C$_2$H$_5$—N—(SOF)$_2$ | (2-2) |
| C$_3$H$_7$—N—(SOF)$_2$ | (2-3) |
| CH$_2$=CH—N—(SOF)$_2$ | (2-4) |
| CH≡C—N—(SOF)$_2$ | (2-5) |

| | |
|---|---|
| $C_6H_5$—N—$(SOF)_2$ | (2-6) |
| $C_6H_{11}$—N—$(SOF)_2$ | (2-7) |
| $CH_3$—C(=O)O—$C_2H_4$—N—$(SOF)_2$ | (2-8) |
| $CH_3OC$(=O)—$C_2H_4$—N—$(SOF)_2$ | (2-9) |
| $CH_3OC$(=O)O—$C_2H_4$—N—$(SOF)_2$ | (2-10) |
| $CH_3OC$(=O)O—$C_3H_6$—N—$(SOF)_2$ | (2-11) |
| $CF_3$—N—$(SOF)_2$ | (2-12) |
| $C_6H_5$—$CH_2$—N—$(SOF)_2$ | (2-13) |
| $CH_3$—N—$(SOCl)_2$ | (2-14) |
| $CH_3$—N—$(SOBr)_2$ | (2-15) |
| $CH_3$—N—$(SOI)_2$ | (2-16) |
| $CH_3O$—$C_2H_4$—N—$(SOF)_2$ | (2-17) |
| $CH_3$—$(OC_2H_4)_2$—N—$(SOF)_2$ | (2-18) |
| $CH_3OC$(=O)—N—$(SOF)_2$ | (2-19) |

(6) The non-aqueous secondary battery according to any one of (1) to (5), wherein one or both contents of the disulfonyl compound and the disulfinyl compound in the electrolytic solution are from 0.0005 mass % to 8 mass % both inclusive.

(7) The non-aqueous secondary battery according to any one of (1) to (6), wherein the non-aqueous solvent includes one or more of compounds selected from a group including a first unsaturated cyclic ester carbonate represented by a following Formula (3), a second unsaturated cyclic ester carbonate represented by a following Formula (4), a third unsaturated cyclic ester carbonate represented by a following Formula (5), a halogenated cyclic ester carbonate represented by a following Formula (6), and a halogenated chain ester carbonate represented by a following Formula (7),

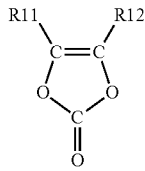
(3)

where each of R11 and R12 is one of a hydrogen group and an alkyl group,

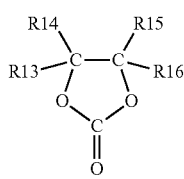
(4)

where each of R13 to R16 is one of a hydrogen group, an alkyl group, a vinyl group, and an allyl group; and one or more of R13 to R16 each are a vinyl group or an allyl group,

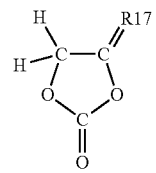
(5)

where R17 is >CR31R32; and each of R31 and R32 is one of a hydrogen group and an alkyl group,

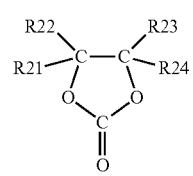
(6)

where each of R21 to R24 is one of a hydrogen group, a halogen group, an alkyl group, and a halogenated alkyl group; and one or more of R21 to R24 are each one of a halogen group and a halogenated alkyl group,

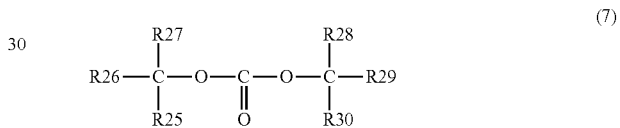
(7)

where each of R25 to R30 is one of a hydrogen group, a halogen group, an alkyl group, and a halogenated alkyl group; and one or more of R25 to R30 are each a halogen group or a halogenated alkyl group.

(8) The non-aqueous secondary battery according to any one of (1) to (7), wherein the electrolyte salt includes lithium bis(fluorosulfonyl)imide (LiN(SO$_2$F)$_2$).

(9) The non-aqueous secondary battery according to any one of (1) to (8), wherein the cathode, the anode, and the electrolytic solution are contained inside a film-like outer package member.

(10) The non-aqueous secondary battery according to any one of (1) to (9), wherein the non-aqueous secondary battery is a lithium secondary battery.

(11) An electrolytic solution including:
a non-aqueous solvent,
an electrolyte salt, and
one or both of a disulfonyl compound represented by a following Formula (1) and a disulfinyl compound represented by a following Formula (2),

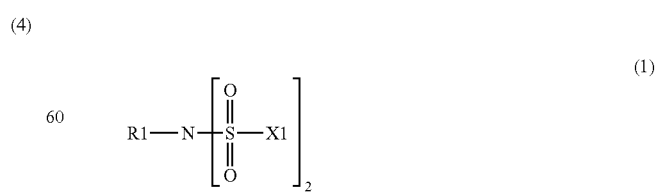
(1)

where R1 is one of a hydrocarbon group, a halogenated hydrocarbon group, an oxygen-containing hydrocarbon group, a halogenated oxygen-containing hydrocarbon group, and a group obtained by bonding two or more thereof to one another; and X1 is a halogen group,

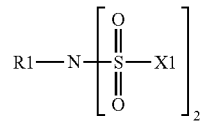

(1)

wherein R1 is one of a hydrocarbon group, a halogenated hydrocarbon group, an oxygen-containing hydrocarbon group, a halogenated oxygen-containing hydrocarbon group, and a group obtained by bonding two or more thereof to one another; and X1 is a halogen group,

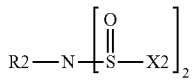

(2)

where R2 is one of a hydrocarbon group, a halogenated hydrocarbon group, an oxygen-containing hydrocarbon group, a halogenated oxygen-containing hydrocarbon group, and a group obtained by bonding two or more thereof to one another; and X2 is a halogen group.

(12) A battery pack including:
the non-aqueous secondary battery according to any one of (1) to (10);
a control section configured to control operation of the non-aqueous secondary battery; and
a switch section configured to switch the operation of the non-aqueous secondary battery according to an instruction of the control section.

(13) An electric vehicle including:
the non-aqueous secondary battery according to any one of (1) to (10);
a conversion section configured to convert electric power supplied from the non-aqueous secondary battery into drive power;
a drive section configured to operate according to the drive power; and
a control section configured to control operation of the non-aqueous secondary battery.

(14) An electric power storage system including:
the non-aqueous secondary battery according to any one of (1) to (10);
one or more electric devices configured to be supplied with electric power from the non-aqueous secondary battery; and
a control section configured to control the supplying of the electric power from the non-aqueous secondary battery to the one or more electric devices.

(15) An electric power tool including:
the non-aqueous secondary battery according to any one of (1) to (10); and
a movable section configured to be supplied with electric power from the non-aqueous secondary battery.

(16) An electronic apparatus including the non-aqueous secondary battery according to any one of (1) to (10) as an electric power supply source.

It should be understood by those skilled in the art that various modifications, combinations, sub-combinations and alternations may occur depending on design requirements and other factors insofar as they are within the scope of the appended claims or the equivalents thereof.

What is claimed is:
1. A non-aqueous secondary battery comprising:
a cathode;
an anode; and
an electrolytic solution, wherein
the electrolytic solution includes
a non-aqueous solvent,
an electrolyte salt, and
one or both of a disulfonyl compound represented by a following Formula (1) and a disulfinyl compound represented by a following Formula (2),

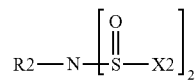

(2)

wherein R2 is one of a hydrocarbon group, a halogenated hydrocarbon group, an oxygen-containing hydrocarbon group, a halogenated oxygen-containing hydrocarbon group, and a group obtained by bonding two or more thereof to one another; and X2 is a halogen group, and wherein
the hydrocarbon group is one of an alkyl group, an alkenyl group, an alkynyl group, an aryl group, and a cycloalkyl group,
the oxygen-containing hydrocarbon group is one of an alkoxy group, a first ester group (—C(=O)—O—R3: R3 is an alkyl group), an ester carbonate group (—O—C(=O)—O—R4: R4 is an alkyl group), a second ester group (—O—C(=O)—R5: R5 is an alkyl group), and a polyether group (—(R6O)$_n$-R7: R6 is an alkylene group, R7 is an alkyl group, and n is an integer number equal to or more than 2),
the halogenated hydrocarbon group and the halogenated oxygen-containing hydrocarbon group each include one or more of elements selected from a group including fluorine (F), chlorine (Cl), bromine (Br), and iodine (I), and
the halogen group is one of a fluorine group (—F), a chlorine group (—Cl), a bromine group (—Br), and an iodine group (—I).

2. The non-aqueous secondary battery according to claim 1, wherein
each of carbon numbers of the alkyl group and the alkoxy group is from 1 to 18 both inclusive,
each of carbon numbers of the alkenyl group and the alkynyl group is from 2 to 18 both inclusive,
a carbon number of the aryl group is from 6 to 18 both inclusive, and
a carbon number of the cycloalkyl group is from 3 to 18 both inclusive.

3. The non-aqueous secondary battery according to claim 1, wherein each of the X1 and the X2 is a fluorine group.

4. The non-aqueous secondary battery according to claim 1, wherein
the disulfonyl compound includes one or more of compounds selected from a group including Formula (1-1) to Formula (1-19), and
the disulfinyl compound includes one or more of compounds selected from a group including Formula (2-1) to Formula (2-19),

| | |
|---|---|
| CH$_3$—N—(SO$_2$F)$_2$ | (1-1) |
| C$_2$H$_5$—N—(SO$_2$F)$_2$ | (1-2) |
| C$_3$H$_7$—N—(SO$_2$F)$_2$ | (1-3) |
| CH$_2$=CH—N—(SO$_2$F)$_2$ | (1-4) |
| CH≡C—N—(SO$_2$F)$_2$ | (1-5) |
| C$_6$H$_5$—N—(SO$_2$F)$_2$ | (1-6) |
| C$_6$H$_{11}$—N—(SO$_2$F)$_2$ | (1-7) |
| CH$_3$—C(=O)O—C$_2$H$_4$—N—(SO$_2$F)$_2$ | (1-8) |
| CH$_3$OC(=O)—C$_2$H$_4$—N—(SO$_2$F)$_2$ | (1-9) |
| CH$_3$OC(=O)O—C$_2$H$_4$—N—(SO$_2$F)$_2$ | (1-10) |
| CH$_3$OC(=O)O—C$_3$H$_6$—N—(SO$_2$F)$_2$ | (1-11) |
| CF$_3$—N—(SO$_2$F)$_2$ | (1-12) |
| C$_6$H$_5$—CH$_2$—N—(SO$_2$F)$_2$ | (1-13) |
| CH$_3$—N—(SO$_2$Cl)$_2$ | (1-14) |
| CH$_3$—N—(SO$_2$Br)$_2$ | (1-15) |
| CH$_3$—N—(SO$_2$I)$_2$ | (1-16) |
| CH$_3$O—C$_2$H$_4$—N—(SO$_2$F)$_2$ | (1-17) |
| CH$_3$—(OC$_2$H$_4$)$_2$—N—(SO$_2$F)$_2$ | (1-18) |
| CH$_3$OC(=O)—N—(SO$_2$F)$_2$ | (1-19) |
| CH$_3$—N—(SOF)$_2$ | (2-1) |
| C$_2$H$_5$—N—(SOF)$_2$ | (2-2) |
| C$_3$H$_7$—N—(SOF)$_2$ | (2-3) |
| CH$_2$=CH—N—(SOF)$_2$ | (2-4) |
| CH≡C—N—(SOF)$_2$ | (2-5) |
| C$_6$H$_5$—N—(SOF)$_2$ | (2-6) |
| C$_6$H$_{11}$—N—(SOF)$_2$ | (2-7) |
| CH$_3$—C(=O)O—C$_2$H$_4$—N—(SOF)$_2$ | (2-8) |
| CH$_3$OC(=O)—C$_2$H$_4$—N—(SOF)$_2$ | (2-9) |
| CH$_3$OC(=O)O—C$_2$H$_4$—N—(SOF)$_2$ | (2-10) |
| CH$_3$OC(=O)O—C$_3$H$_6$—N—(SOF)$_2$ | (2-11) |
| CF$_3$—N—(SOF)$_2$ | (2-12) |
| C$_6$H$_5$—CH$_2$—N—(SOF)$_2$ | (2-13) |
| CH$_3$—N—(SOCl)$_2$ | (2-14) |
| CH$_3$—N—(SOBr)$_2$ | (2-15) |
| CH$_3$—N—(SOI)$_2$ | (2-16) |
| CH$_3$O—C$_2$H$_4$—N—(SOF)$_2$ | (2-17) |
| CH$_3$—(OC$_2$H$_4$)$_2$—N—(SOF)$_2$ | (2-18) |
| CH$_3$OC(=O)—N—(SOF)$_2$ | (2-19). |

5. The non-aqueous secondary battery according to claim 1, wherein one or both contents of the disulfonyl compound and the disulfinyl compound in the electrolytic solution are from 0.0005 mass % to 8 mass % both inclusive.

6. The non-aqueous secondary battery according to claim 1, wherein the non-aqueous solvent includes one or more of compounds selected from a group including a first unsaturated cyclic ester carbonate represented by a following Formula (3), a second unsaturated cyclic ester carbonate represented by a following Formula (4), a third unsaturated cyclic ester carbonate represented by a following Formula (5), a halogenated cyclic ester carbonate represented by a following Formula (6), and a halogenated chain ester carbonate represented by a following Formula (7),

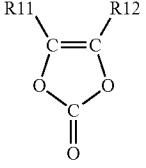

(3)

wherein each of R11 and R12 is one of a hydrogen group and an alkyl group,

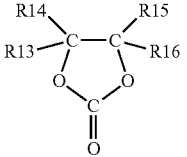

(4)

wherein each of R13 to R16 is one of a hydrogen group, an alkyl group, a vinyl group, and an allyl group; and one or more of R13 to R16 each are a vinyl group or an allyl group,

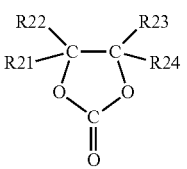

(5)

wherein R17 is >CR31R32; and each of R31 and R32 is one of a hydrogen group and an alkyl group, (6)

wherein each of R21 to R24 is one of a hydrogen group, a halogen group, an alkyl group, and a halogenated alkyl group; and one or more of R21 to R24 are each one of a halogen group and a halogenated alkyl group,

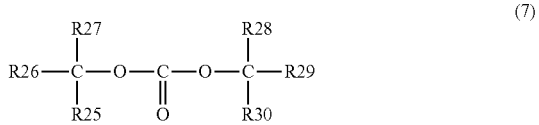

wherein each of R25 to R30 is one of a hydrogen group, a halogen group, an alkyl group, and a halogenated alkyl group; and one or more of R25 to R30 are each a halogen group or a halogenated alkyl group.

7. The non-aqueous secondary battery according to claim 1, wherein the electrolyte salt includes lithium bis(fluorosulfonyl)imide ($LiN(SO_2F)_2$).

8. The non-aqueous secondary battery according to claim 1, wherein the cathode, the anode, and the electrolytic solution are contained inside a film-like outer package member.

9. The non-aqueous secondary battery according to claim 1, wherein the non-aqueous secondary battery is a lithium secondary battery.

10. An electrolytic solution comprising:
a non-aqueous solvent,
an electrolyte salt, and
one or both of a disulfonyl compound represented by a following Formula (1) and a disulfinyl compound represented by a following Formula (2),

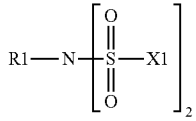

wherein R1 is one of a hydrocarbon group, a halogenated hydrocarbon group, an oxygen-containing hydrocarbon group, a halogenated oxygen-containing hydrocarbon group, and a group obtained by bonding two or more thereof to one another; and X1 is a halogen group,

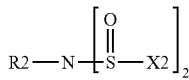

wherein R2 is one of a hydrocarbon group, a halogenated hydrocarbon group, an oxygen-containing hydrocarbon group, a halogenated oxygen-containing hydrocarbon group, and a group obtained by bonding two or more thereof to one another; and X2 is a halogen group, and
wherein
the hydrocarbon group is one of an alkyl group, an alkenyl group, an alkynyl group, an aryl group, and a cycloalkyl group,
the oxygen-containing hydrocarbon group is one of an alkoxy group, a first ester group (—C(=O)—O—R3: R3 is an alkyl group), an ester carbonate group (—O—C(=O)—O—R4:

R4 is an alkyl group), a second ester group (—O—C(=O)—R5: R5 is an alkyl group), and a polyether group (—(R6O)$_n$-R7: R6 is an alkylene group, R7 is an alkyl group, and n is an integer number equal to or more than 2),
the halogenated hydrocarbon group and the halogenated oxygen-containing hydrocarbon group each include one or more of elements selected from a group including fluorine (F), chlorine (Cl), bromine (Br), and iodine (I), and
the halogen group is one of a fluorine group (—F), a chlorine group (—Cl), a bromine group (—Br), and an iodine group (—I).

11. A battery pack comprising:
a non-aqueous secondary battery;
a control section configured to control operation of the non-aqueous secondary battery; and
a switch section configured to switch the operation of the non-aqueous secondary battery according to an instruction of the control section, wherein
the non-aqueous secondary battery includes a cathode, an anode, and an electrolytic solution, and
the electrolytic solution includes a non-aqueous solvent, an electrolyte salt, and one or both of a disulfonyl compound represented by a following Formula (1) and a disulfinyl compound represented by a following Formula (2),

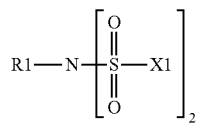

wherein R1 is one of a hydrocarbon group, a halogenated hydrocarbon group, an oxygen-containing hydrocarbon group, a halogenated oxygen-containing hydrocarbon group, and a group obtained by bonding two or more thereof to one another; and X1 is a halogen group,

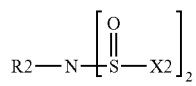

wherein R2 is one of a hydrocarbon group, a halogenated hydrocarbon group, an oxygen-containing hydrocarbon group, a halogenated oxygen-containing hydrocarbon group, and a group obtained by bonding two or more thereof to one another; and X2 is a halogen group, and
wherein
the hydrocarbon group is one of an alkyl group, an alkenyl group, an alkynyl group, an aryl group, and a cycloalkyl group,
the oxygen-containing hydrocarbon group is one of an alkoxy group, a first ester group (—C(=O)—O—R3: R3 is an alkyl group), an ester carbonate group (—O—C(=O)—O—R4:
R4 is an alkyl group), a second ester group (—O—C(=O)—R5: R5 is an alkyl group), and a polyether group (—(R6O)$_n$-R7: R6 is an alkylene group, R7 is an alkyl group, and n is an integer number equal to or more than 2), the halogenated hydrocarbon group and the halogenated oxygen-containing hydrocarbon group each include one or more of elements selected from a group including fluorine (F), chlorine (Cl), bromine (Br), and iodine (I), and the halogen group is one of a fluorine group (—F), a chlorine group (—Cl), a bromine group (—Br), and an iodine group (—I).

* * * * *